US009657822B2

(12) United States Patent
Park et al.

(10) Patent No.: US 9,657,822 B2
(45) Date of Patent: May 23, 2017

(54) INPUT SYNTHESIS GEAR SYSTEM

(71) Applicant: HYCORE CO., LTD., Seoul (KR)

(72) Inventors: Dong Hyun Park, Gwangmyeong-si (KR); Ho Yul Lee, Seoul (KR)

(73) Assignee: HYCORE CO., LTD., Seoul (KR)

( * ) Notice: Subject to any disclaimer, the term of this patent is extended or adjusted under 35 U.S.C. 154(b) by 8 days.

(21) Appl. No.: 14/646,255

(22) PCT Filed: Aug. 13, 2013

(86) PCT No.: PCT/KR2013/007271
§ 371 (c)(1),
(2) Date: May 20, 2015

(87) PCT Pub. No.: WO2014/081105
PCT Pub. Date: May 30, 2014

(65) Prior Publication Data
US 2015/0300472 A1 Oct. 22, 2015

(30) Foreign Application Priority Data

Nov. 21, 2012 (KR) .................. 10-2012-0132386
Aug. 12, 2013 (KR) .................. 10-2013-0095250

(51) Int. Cl.
*F16H 3/76* (2006.01)
*F16H 37/08* (2006.01)
(Continued)

(52) U.S. Cl.
CPC ......... *F16H 37/0826* (2013.01); *B60W 10/04* (2013.01); *B62M 6/55* (2013.01);
(Continued)

(58) Field of Classification Search
CPC ........... B60K 1/02; B60K 7/0007; F16H 3/76; F16H 3/005; F16H 3/003; F16H 37/0826;
(Continued)

(56) References Cited

U.S. PATENT DOCUMENTS 6,131,683 A * 10/2000 Wada .................. B62M 6/55
180/216
6,379,276 B1 * 4/2002 Cheng ................. F16H 37/0826
475/330
(Continued)

FOREIGN PATENT DOCUMENTS

JP 57-057943 A 4/1982
JP H08308178 A 11/1996
(Continued)

*Primary Examiner* — Derek D Knight
*Assistant Examiner* — David Morris
(74) *Attorney, Agent, or Firm* — Novick, Kim & Lee, PLLC; Jae Youn Kim

(57) ABSTRACT

A gear system for combining inputs is provided. The gear system can includes: a first power source that generates a rotational force; a second power source that generates a rotational force identical to or different from the rotational force of the first power source; a third power source that generates a rotational force identical or different from the rotational forces of the first power source and the second power source; and a gear unit that generates a resultant output by combining the rotational forces from the first power source to the third power source, in which the gear unit generates a resultant output by combining torque of any two of the first power source to the third power source and combining a speed of the other power source. According to this configuration, it is possible to generate various outputs from various power sources having the same or different characteristics.

13 Claims, 30 Drawing Sheets

(51) Int. Cl.
*B62M 6/55* (2010.01)
*B60W 10/04* (2006.01)
*F16H 37/06* (2006.01)
*B60K 1/02* (2006.01)
*B60K 7/00* (2006.01)
*F16H 3/00* (2006.01)

(52) U.S. Cl.
CPC ............... *F16H 3/005* (2013.01); *F16H 3/76* (2013.01); *B60K 1/02* (2013.01); *B60K 7/0007* (2013.01); *B60K 2007/003* (2013.01); *B60K 2007/0061* (2013.01); *B60K 2007/0069* (2013.01); *F16H 3/003* (2013.01); *F16H 37/06* (2013.01); *F16H 37/065* (2013.01); *F16H 37/08* (2013.01); *F16H 37/0806* (2013.01)

(58) Field of Classification Search
CPC .... F16H 37/0806; F16H 37/08; F16H 37/065; F16H 37/06; B62M 6/55
See application file for complete search history.

(56) References Cited

U.S. PATENT DOCUMENTS

| | | | |
|---|---|---|---|
| 7,108,625 B2* | 9/2006 | Konig | F16H 37/0826 475/5 |
| 2011/0185849 A1* | 8/2011 | Yang | F16H 3/003 74/810.1 |
| 2013/0184112 A1* | 7/2013 | Choi | F16H 37/065 475/5 |

FOREIGN PATENT DOCUMENTS

| | | |
|---|---|---|
| JP | 2010041747 A | 2/2010 |
| JP | 2012-125898 B1 | 7/2012 |
| KR | 10-2012-0028234 A | 3/2012 |
| KR | 10-1173679 B1 | 8/2012 |
| WO | 2012-036426 A2 | 3/2012 |

* cited by examiner

INPUT SYNTHESIS GEAR SYSTEM

TECHNICAL FIELD

The present invention relates to a gear system for combining inputs, and more particularly, to a gear system for combining inputs that can provide various outputs by combining inputs from a plurality of power sources, which have the same or different characteristics or capacities, and outputting all of their original characteristics or the combined characteristics.

BACKGROUND ART

In general, there is a need for a motor and a power source such as an engine for controlling a robot, a vehicle, a carrier, or a mechanical system and it is required to select the capacity of the power source to complete requested work (operation and action). For example, when a power source is a motor, the capacity of the motor is in close connection with the size, weight, and cost of the motor.

A power source with large capacity is required to operate a robot or a mechanical system with large torque at a high speed, so the size, weight, and cost of the robot or the mechanical system increase.

Vehicles are equipped with a gear shift system that changes a gear ratio when a rotational force from the engine is transmitted to wheels in order to achieve both of high-torque output for smooth driving on a slope and high-speed output for high-speed driving. However, such a gear shift system is difficult to apply to a small driving system due to a complicated mechanical configuration and problems with cost and weight.

Meanwhile, the applicant(s) has proposed a planetary gear system using two input characteristics in Korean Patent Application Publication No. 10-2012-0028234. However, the applicant(s) has proposed only a technology of combining input speeds in the application. Accordingly, there is a need for a gear system that can combine torque in addition to input speeds to achieve outputs with more various characteristics.

Therefore, the present invention proposes a technology that uses combinations of characteristic of different motors to achieve the characteristics of complicated mechanical system such as the gear shift system for automatic motor vehicles even without using the complicate mechanical system in order to be simply applied to a small motor system.

Further, the present invention provides a gear system that can be simply applied to a small driving system and generate various outputs by combining three or more inputs.

DISCLOSURE

Technical Problem

An aspect of the present invention provides a gear system for combining inputs of a plurality of power sources which generates new outputs by combining outputs from power sources having different or the same characteristics, in detail, a gear system for combining inputs which can use the characteristics of power sources for independent outputs, can generate one output by combining the characteristics of power sources, if necessary, and can operate a motor with the optimum torque at the optimum speed, if necessary, by varying output characteristics of power sources, by changing the characteristics of power source or changing the reduction ratios of the power sources.

An aspect of the present invention also provides a gear system for combining inputs which can generate various outputs by combining a plurality of power sources having different or the same characteristics.

An aspect of the present invention also provides a gear system for combining inputs which can generate various outputs by separately combining torque and speed of power sources.

An aspect of the present invention also provides a gear system for combining inputs which can generate various outputs by sequentially combining torque and speed of power sources.

An aspect of the present invention also provides a gear system for combining inputs which can combine all of three power sources or selectively combine two power sources in a system using at least three power sources for inputting.

Technical Solution

According to an aspect of the present invention, there is provided a gear system for combining inputs which includes: a first gear unit; a second gear unit that rotates in mesh with the first gear unit; a third gear unit that rotates in mesh with at least one of the first gear unit and the second gear unit; and power sources that generate a driving force, in which two of the first to third gear units are input parts receiving a driving force from the power sources, respectively, the other one is an output part outputting a resultant force of the driving forces, the power sources include a first power source and a second power source having the same or different outputs, and at least one of the first power source and the second power source includes a fourth gear unit providing the same output direction with different reduction gear ratios in accordance with the rotational direction of the power source.

The first power source and the second power source may each include a motor and the motors may have different capacity or different reduction ratios.

One of the motors may have a low speed-high torque characteristic and the other one may have a high speed-low torque characteristic.

The fourth gear unit may include: a forward gear and a backward gear that rotate forward and backward, respectively when a motor rotates forward and backward; a first input gear and a second input gear that input a driving force to corresponding input parts in cooperation with the forward gear and the backward gear; and at least one intermediate gear that is engaged with the forward gear and the first input gear or the backward gear and the second input gear.

The forward gear and the backward gear may respectively include a clutch bearing or a one-way bearing.

Meanwhile, according to another aspect of the present invention, there is provided a gear system for combining inputs which includes: a first power source that generates a rotational force; a second power source that generates a rotational force identical to or different from the rotational force of the first power source; a third power source that generates a rotational force identical or different from the rotational forces of the first power source and the second power source; and a gear unit that generates a resultant output by combining the rotational forces from the first power source to the third power source, in which the gear unit generates a resultant output by combining torque of any two of the first power source to the third power source and combining a speed of the other power source.

According to this configuration, it is possible to generate various outputs from various power sources having the same or different characteristics.

The gear unit may include: first to third main gears directly coupled to rotary shafts of the first to third power sources; and a connection gear assembly receiving rotational forces from at least two of the first to third main gears.

The connection gear assembly may include at least one direct gear having a rotational center in a straight line with the rotational centers of the first to third main gears.

The direct gear may include a first direct gear engaged with the first main gear and the third main gear and a second direct gear engaged with the second main gear.

When the first to third main gears are all rotated with the first direct gear engaged with the first main gear and the third main gear, torque of the first to third power sources may be combined by the first direct gear.

The connection gear assembly may include an idle gear that combines speeds of the first power source and the second power source or combines speeds of the second power source and the third power source.

The direct gear may be engaged with the first main gear and the second main gear and the connection gear assembly may include an idle gear internally engaged with the direct gear.

The connection gear assembly may include a direct gear engaged with any two of the first to third main gears and an idle gear rotated passively by a rotational force of the direct gear.

The first to third power source may be arranged such that any two of the first to third main gears are all engaged with the direct gear and the other main gear is engaged with the idle gear.

Torque of a power source engaged with the direct gear of the first to third power sources may be combined, and the speed of a power source engaged with the idle gear may be combined.

The idle gear may combine speeds by receiving the rotational force of two main gears of which torque is assembled by the direct gear and the rotational force of the other main gear.

Advantageous Effects

As set forth above, according to exemplary embodiments of the invention, the gear system for combining inputs according to an exemplary embodiment of the present invention outputs the resultant force of driving forces from a plurality of or at least three power sources having different characteristics and separately combines torque or speeds, so it can generate various outputs.

The gear system for combining inputs according to an exemplary embodiment of the present invention can separately or sequentially combine torque or speeds of power sources, so it can provide various outputs of speeds or torque, if necessary, and achieve gear shifting accordingly.

The gear system for combining inputs according to an exemplary embodiment of the present invention can generate high speed-low torque or low speed-high torque, if necessary, by combining input characteristics of a plurality of or at least three power sources, and thus, it can freely change output characteristics of small driving system such as a small robot. Further, it can be effectively applied to a small system and can be modularized for cost saving and mass production.

The gear system for combining inputs according to an exemplary embodiment of the present invention can increase the maximum speed and the maximum torque in comparison to the size and weight of power sources and can operate power source in various ways in accordance with the loads on an output shaft, so it can improve energy efficiency.

The gear system for combining inputs according to an exemplary embodiment of the present invention can output a resultant force of driving forces from two power source having different characteristics, and particularly, it can receive a driving force in the same direction with different reduction ratios in accordance with the rotational directions of a motor from the same power source, so it can provide various speed and torque combinations, if necessary, and can achieve gear shifting.

BEST MODE

Figure 1:
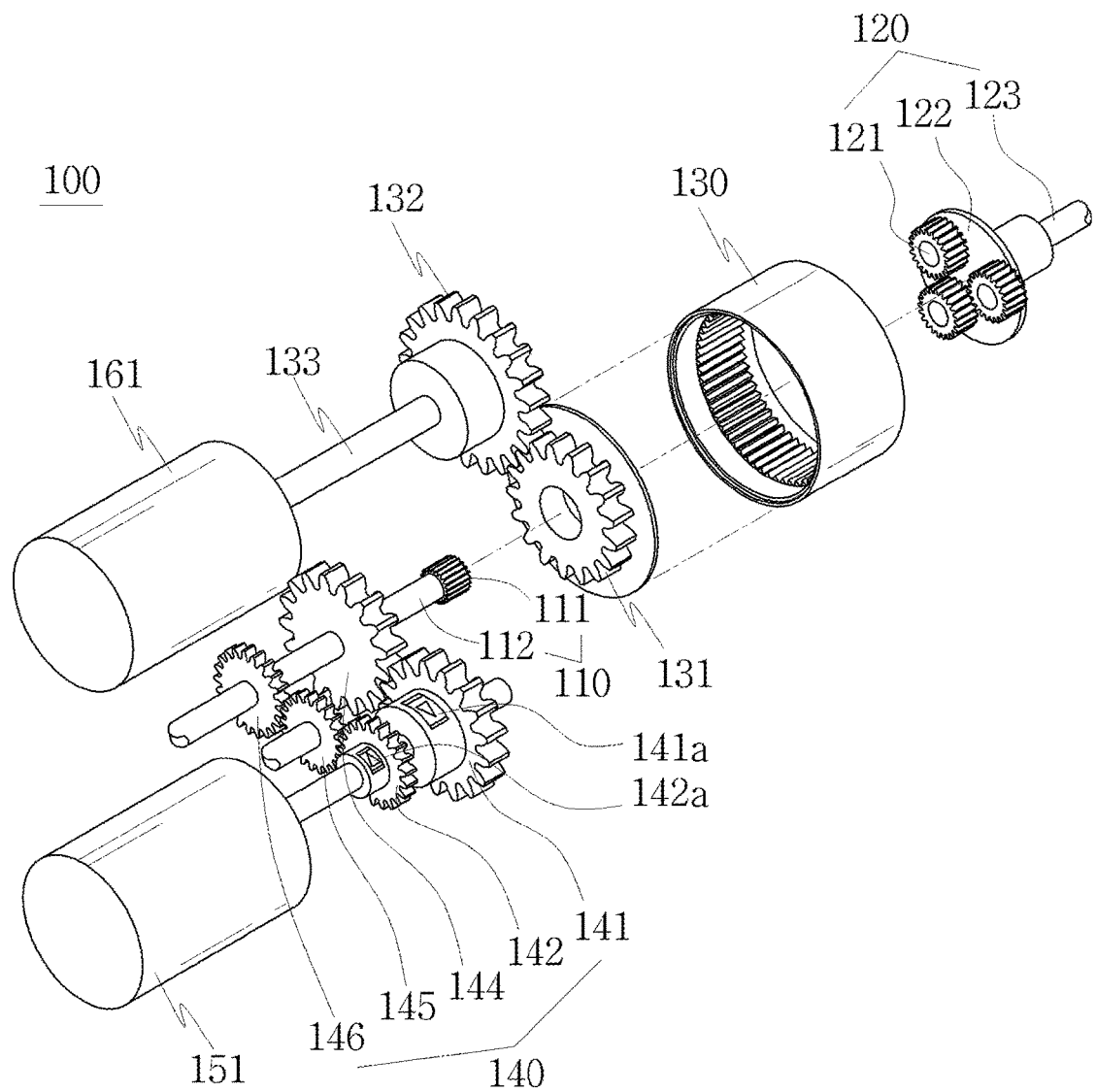
FIGS. 1 and 2 are view illustrating a gear system for combining a plurality of power sources according to an exemplary embodiment of the present invention.

Hereinafter, exemplary embodiments of the present invention will be described in detail with reference to the accompanying drawings. In the specification, in adding reference numerals to components throughout the drawings, it should be noted that like reference numerals designate like components even though components are illustrated in different drawings. Further, in describing the present invention, well-known functions or constructions will not be described in detail since they may unnecessarily obscure the understanding of the present invention.

Figure 2:
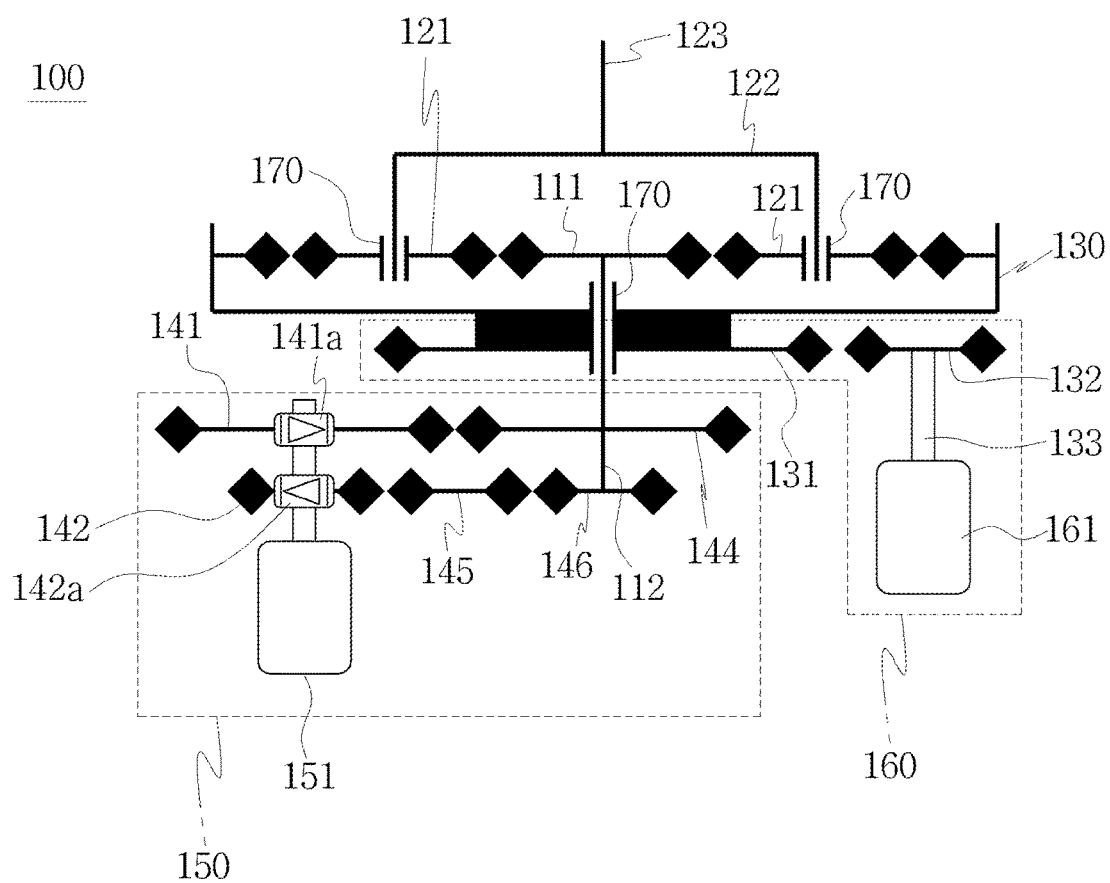

FIGS. 1 and 2 are view illustrating a gear system 100 for combining a plurality of power sources according to an exemplary embodiment of the present invention, that is, FIG. 1 is a schematic exploded perspective view of the gear system 100 and FIG. 2 is a diagram illustrating the assembly of the gear system 100 of FIG. 1.

In the following description, it is exemplified that two power sources are used and the power sources are motors, for convenience. It may be possible to combine the characteristics of a plurality of power sources by combining a resultant output of two power sources with another power source.

The gear system 100 according to an exemplary embodiment of the present invention can generate various outputs by combining the characteristics of two different power sources. The gear system 100 can be used in various fields that are required changing output characteristics in accordance with situations. That is, it is possible to freely and selectively achieve a high speed-low torque output or a low speed-high torque output through one gear system 100.

The gear system 100 includes a first gear unit 110, a second gear unit 120, a third gear unit 130, and a fourth gear unit 140. In particular, two of the first to third gear units 110 to 130 may be input parts for receiving a driving force and the other one may be an output part for outputting a resultant force of driving forces, but it is assumed in this exemplary embodiment that the first and third gear unit 110 and 130 are input parts and the second gear unit 120 is an output part.

The fourth gear unit 140, which is a part changing a reduction ratio with the same output direction in accordance with the rotational direction of a power source (for example, a motor), may be included in at least one of a first power source 150 and a second power source 160 that transmit a driving force to the input part, but it is assumed in an exemplary embodiment of the present invention that the fourth gear unit 140 is included in the first power source 150.

The first gear unit 110 and the second gear unit 120 rotate in mesh with each other. The third gear unit 130 rotates in mesh with at least one of the first gear unit 110 and the second gear unit 120.

In the following exemplary embodiments, it is assumed that the first to third gear units 110, 120, and 130 are a sun gear, a planetary gear coupled to a carrier, and a ring gear, respectively, in a planetary gear set. That is, it is exemplified a planetary gear set including a sun gear, a carrier, a planetary gear, and a ring gear is used in the gear system 100 according to an exemplary embodiment of the present invention. However, it should be understood that other types of gears including two gear units as input parts can be used. It is exemplified hereafter that a planetary gear set is used.

The first gear unit 110 may include a sun gear 111 and a sun gear shaft 112 coupled to the sun gear 111 and transmits a driving force to the sun gear 111 or receives a driving force from the sun gear 111. The second gear unit 120 may include a carrier 122, one or more planetary gears 121 capable of rotating on a side of the carrier 122, and a carrier shaft 123 connected to the other side of the carrier 122 and transmits a driving force.

The sun gear 111 is disposed inside the planetary gears 121 and rotated in mesh with them. Accordingly, the sun gear 111 and the planetary gears 121 generally rotate in opposite directions. In the second gear unit 120, the planetary gears 121 can rotate and revolve by rotation of the carrier 122.

The third gear unit 130 is a ring gear. The ring gear is generally formed by forming gear teeth around the inner side of a ring. The third gear 130, which is a ring gear in this exemplary embodiment, is externally engaged with the planetary gears 121 of the second gear unit 120. Accordingly, the third gear unit 130 is rotated by rotation of the second gear unit 120.

The gear units influence the rotation of each other due to this engagement, so input forces are combined and outputted. Two of the first gear unit to the third gear unit 110, 120, and 130 are input parts. That is, there are two gear units that receive a driving force from a power source.

The fourth gear unit 140 may include a forward gear 141 and a backward gear 142 that rotate forward and backward, respectively, when a motor used as an example of a power source rotates forward and backward, a first input gear 144 that rotates in mesh with the forward gear 141 and inputs a driving force to the sun gear shaft 112 of the corresponding input part, an intermediate gear 145 that rotates in mesh with the backward gear, and a second input gear 146 that rotates in mesh with the intermediate gear 145 and inputs a driving force to the sun gear shaft 112 of the corresponding input part.

The forward gear 141 and the backward gear 142 may include respectively clutch bearings 141a and 142a or one-way bearings for rotation in only one direction in accordance with the rotational direction of the motor.

Figure 3:
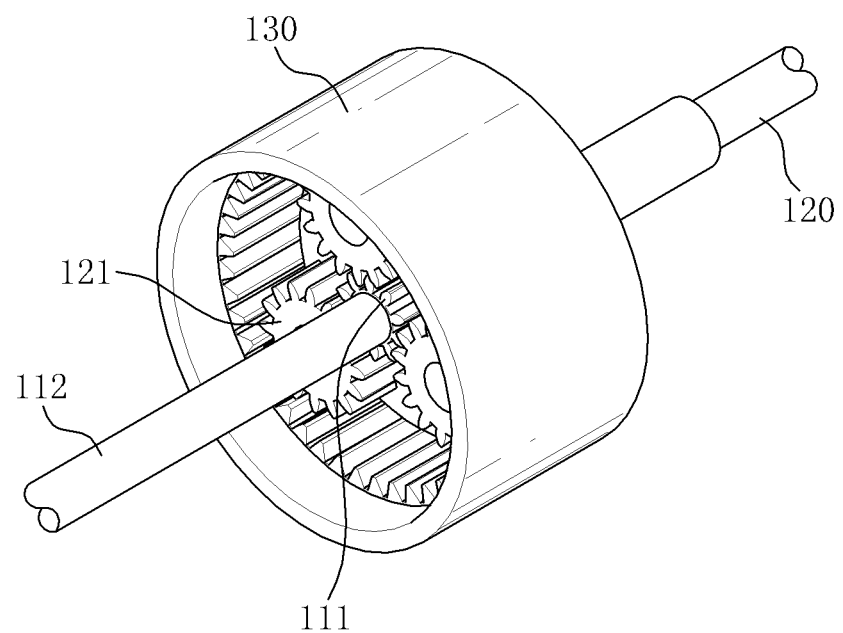
FIGS. 3 and 4 are views illustrating the planetary gear set of FIG. 1.
Figure 4:
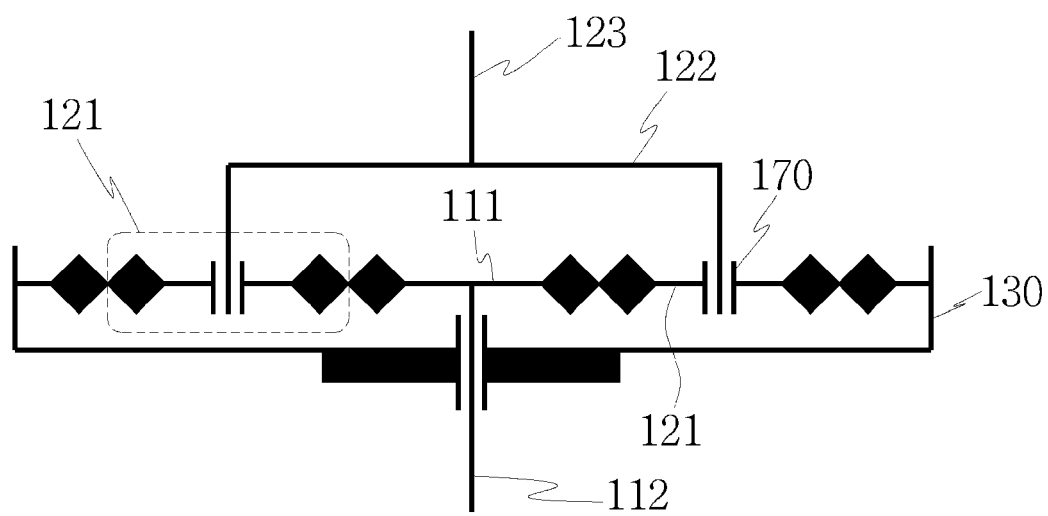

FIGS. 3 and 4 illustrate the planetary gear set of FIG. 1, that is, FIG. 3 is a perspective view illustrating the assembly of the planetary gear set and FIG. 4 is a diagram illustrating power transmission in FIG. 3.

A typical planetary gear set includes a sun gear, a ring gear, and a carrier coupled to planetary gears. In general, in a planetary gear set that is used as a reduction gear system, one of a sun gear, a ring gear, a carrier is connected to a motor as a input shaft, another one is fixed, and the other one is used as an output shaft, but in this exemplary embodiment, two are used for input and one is used for output without a fixed shaft so that two inputs are combined in the planetary gear set.

The planetary gear set illustrated in FIG. 3 is an exemplary system in which the shaft 112 of a sun gear 111 and the shaft 133 of a ring gear 130 are used for input and the shaft 123 of a carrier 122 is used for output. Power transmission in the configuration illustrated in FIG. 3 is illustrated in FIG. 4, in which the gears may be equipped with a bearing 170 for smooth rotation, respectively.

Figure 5:
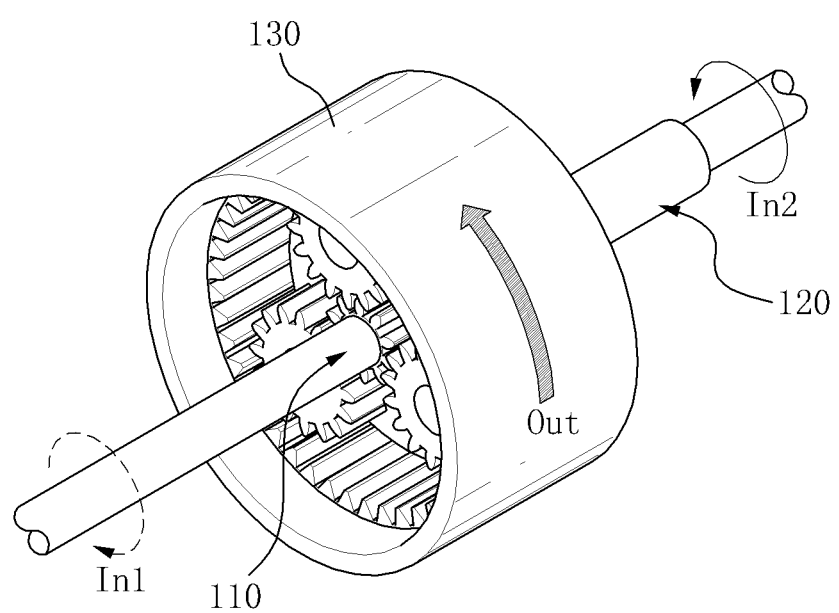
FIGS. 5 to 7 are exemplary views illustrating various input-output relationships using two input characteristics in the planetary gear set of FIG. 3.
Figure 6:
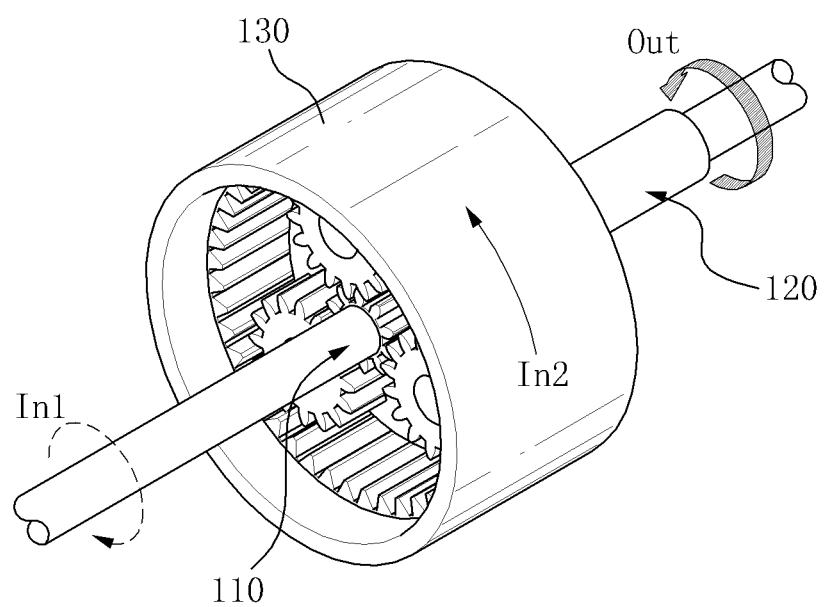
Figure 7:
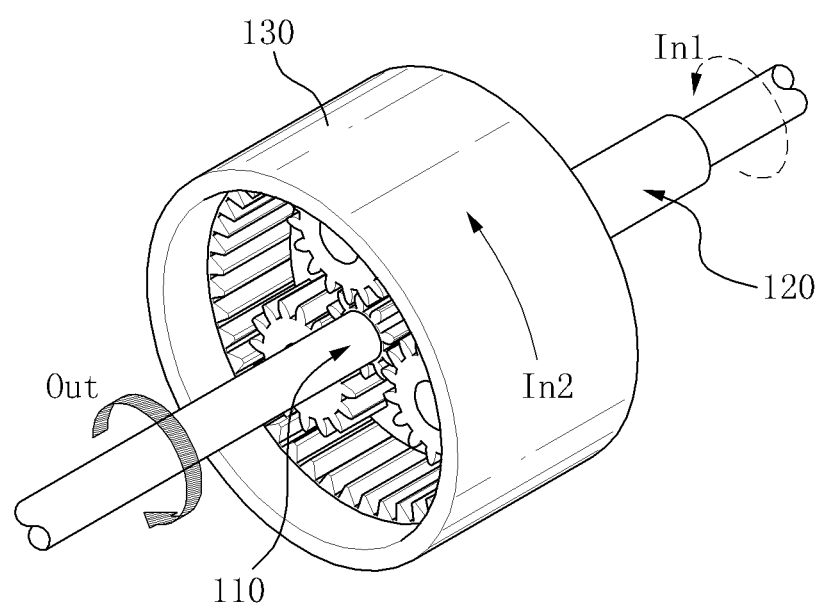

FIGS. 5 to 7 are exemplary views illustrating various input-output relationships using two input characteristics in the planetary gear set of FIG. 3.

Referring to FIG. 5, the first gear unit 110 and the second gear unit 120 are input parts and driving forces In1 and In2 are inputted through the two gear units 110 and 120. The resultant force of the inputted driving forces is output Out through the third gear unit 130. Accordingly, it is possible to achieve various outputs through the third gear unit 130 by adjusting the gear characteristics of the first gear unit 110 and the second gear unit 120 or adjusting the characteristics of the driving forces transmitted to the gear units 110 and 120.

Referring to FIG. 6, the first gear unit 110 and the third gear unit 130 are input parts and input driving forces In1 and In2 and the second gear unit 120 is an output part and outputs Out a resultant force. Referring to FIG. 7, the second gear unit 120 and the third gear unit 130 are input parts and input driving forces In1 and In2 and the first gear unit 110 is an output part and outputs Out a resultant force. The gear units that are input and output parts may depend on the characteristics of the object where the gear system is applied, or the manufacturing method of the gear system, and the principle of transmitting a force is the same as described above.

In the following description, the first gear unit 100 including the sun gear 111 and the third gear unit 130 exemplified as the ring gear 130 are input parts and the second gear unit 120 including the planetary gears 121 and the carrier 122 is an output part.

The first gear unit 110 and the third gear unit 130 may transmit driving forces from different power sources, respectively. The power sources may include the first power source 150 and the second power source 160. The first power source 150 and the second power source 160 may be various power transmission units such as a motor, a pump, or a cylinder that can transmit a driving force, and in the following exemplary embodiments, motors are exemplified.

The first power source 150 inputs a driving force to the first gear unit 110.

For example, when the motor 151 of the first power source 150 rotates forward, that is, right, the forward gear 141 rotates, the first input gear 144 engaged with the forward gear 141 rotates, and accordingly, the sun gear shaft 112 rotates and the sun gear 111 rotates. Alternatively, when the motor 151 of the first power source 150 rotates backward, that is, left, the backward gear 142 rotates, the intermediate gear 145 engaged with the backward gear 142 rotates, and accordingly, the sun gear shaft 112 rotates and the sun gear 111 rotates.

As in the two examples described above, in an exemplary embodiment of the present invention, although the reduction ratios from one motor 151 are different in accordance with the rotational direction of the motor by the fourth gear unit 140 of the first power source 150, but driving forces providing the same output direction can be provided to the first gear unit 110.

As another example, the second power source 160 inputs a driving force to the third gear unit 130 through a motor 161, a ring gear shaft 133, and connection gears 131 and 132

The first and second power sources 150 and 160 may have different outputs. For example, the motor 151 of the first power source 150 and the motor 161 of the second power source 160 may have different capacity or different reduction ratios.

In detail, the first power source 150 may be set to have a low maximum speed, but high maximum torque (a low speed-high torque characteristic) and the second power source 160 may be set to have a high maximum speed, but low maximum torque (a high speed-low torque characteristic). That is, the first power source 150 and the second power source 160 may be set to have opposite characteristics.

Accordingly, it is possible to control the characteristic of a resultant driving force outputted to the second gear unit 120 by adjusting the characteristics of the driving forces.

On the other hand, though not illustrated in the figures, an encoder may be mounted on the output shafts of the power sources to measure the speed and angle of the power sources. Further, a bearing may be disposed between the gears and the shafts and the planetary gear set may be fixed at a position, but freely rotated.

According the an exemplary embodiment of the present invention, the gear system 100 may be formed in the type of a gear module composed of the first gear unit 110 receiving a first driving force, the third gear unit 130 receiving a second driving force, and the second gear unit 120 outputting the resultant force of the first driving force and the second driving force. The first driving force and the second driving force may have different output characteristics.

By this modularization, the size, weight, and manufacturing cost can be reduced and mass production becomes possible. Various power sources (such as a motor) may be connected to the gear module, if necessary. Alternatively, a motor having a specific gear ratio may be included in the module. The gear module may further include a worm gear for preventing back-drive of a power source.

FIGS. 8A to 8C and FIG. 10 are exemplary views illustrating an input/output relationship in the gear system 100 of FIG. 2.

Figure 8A:
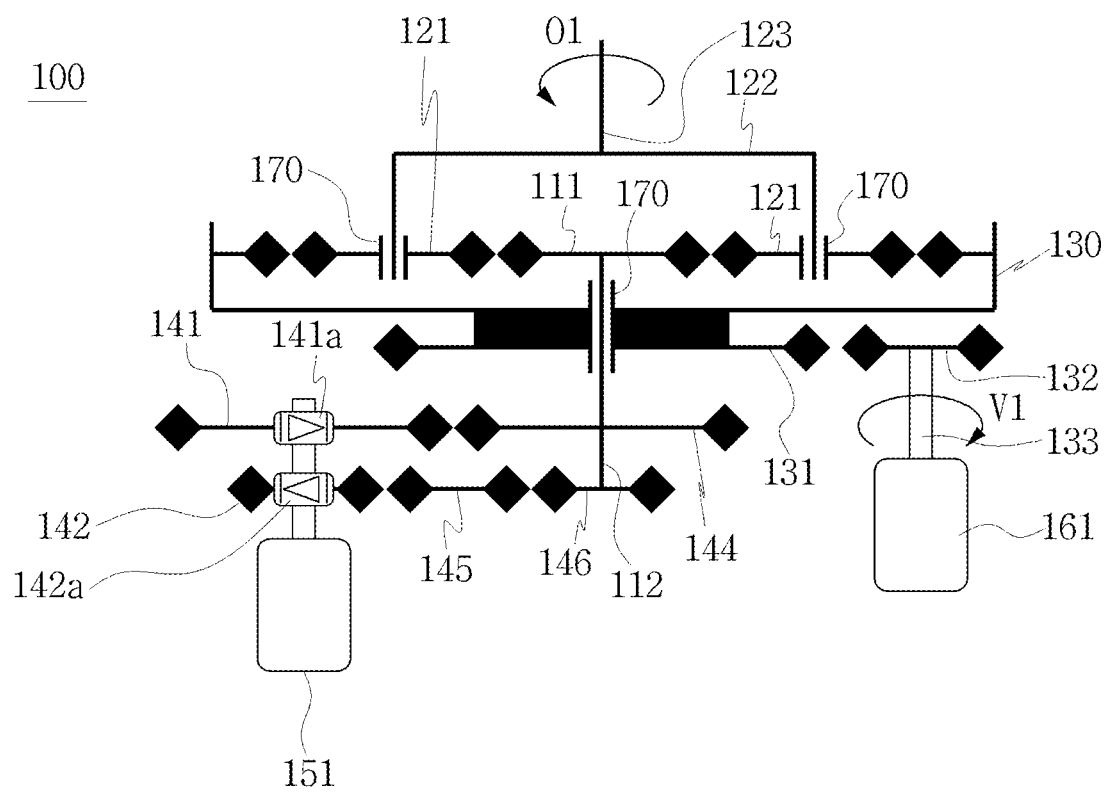
FIGS. 8A to 8C, FIG. 9 and FIG. 10 are exemplary views illustrating an input/output relationship in the gear system of FIG. 2.
Figure 8B:
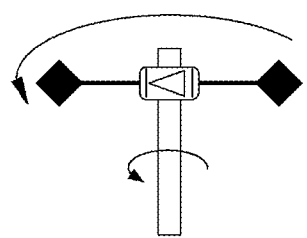
Figure 8C:
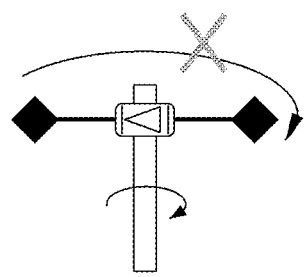

FIGS. 8A to 8C illustrate an example of operating clutch bearing (or a one-way bearing or a lock bearing) used in an exemplary embodiment of the present invention. FIG. 8B illustrate that an input from a motor is transmitted to an output part through a clutch bearing, and when the motor rotates in the opposite direction to that of FIG. 8B, a rotational force is not transmitted to the output shaft, as in FIG. 8C.

Figure 9:
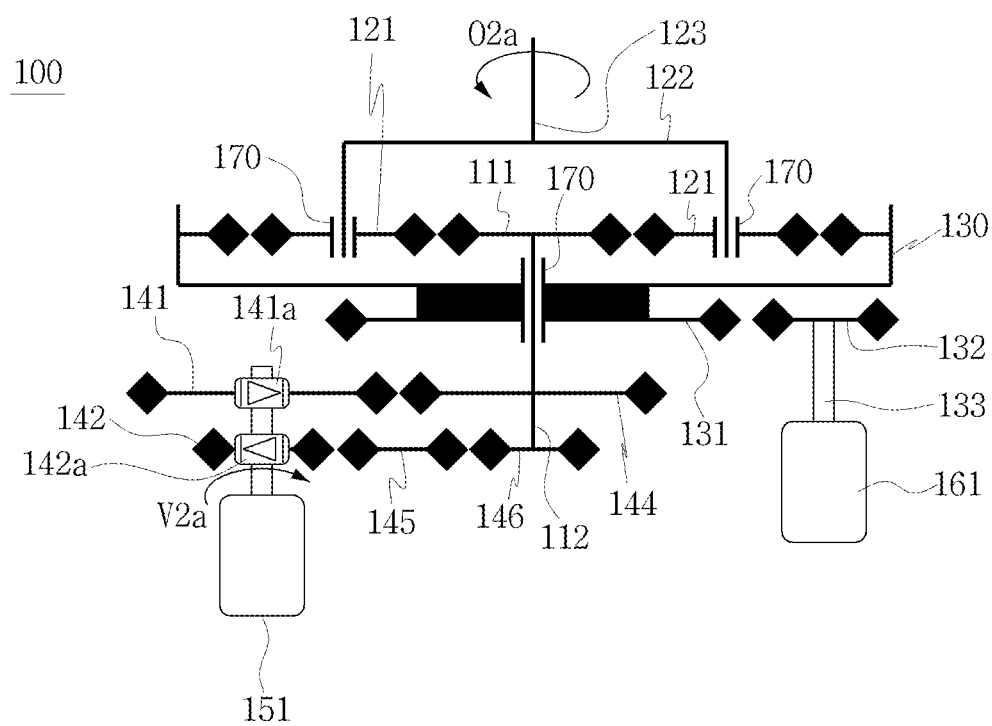
Figure 10:
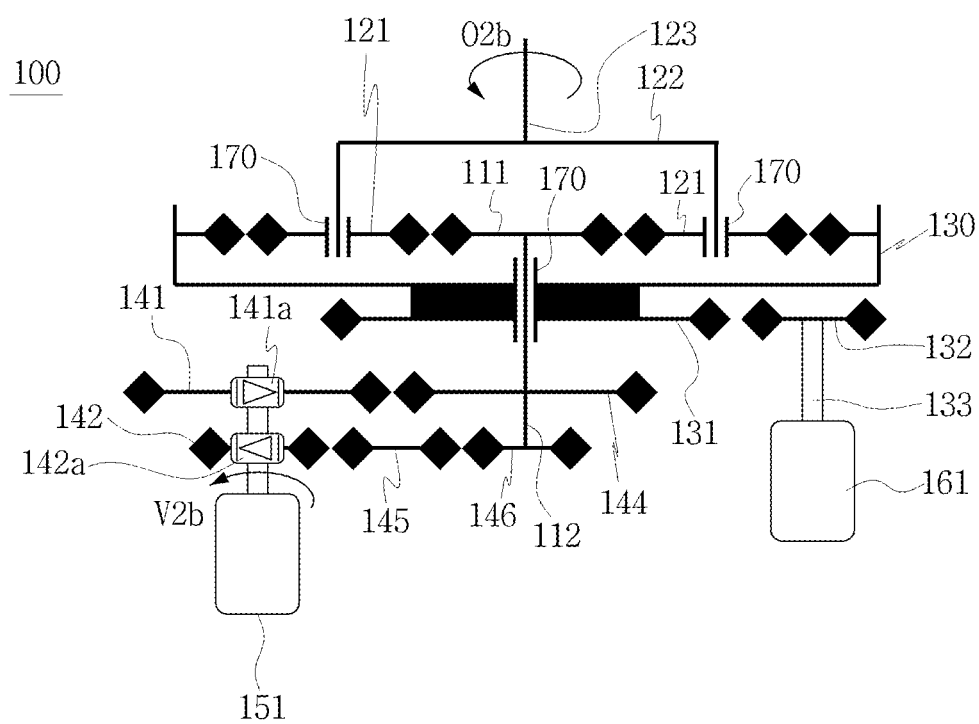

When the motor 161 of the second power source 160 rotates forward at a speed V1, the speed of the final output shaft 123 is O1, as in FIG. 8A, when the motor 151 of the first power source 150 rotates forward at a speed V2a, the speed of the final output shaft 123 is O2a, as in FIG. 9, and when the motor 151 of the first power source 150 rotates (operates) backward, in the opposite direction to V2a of FIG. 9, at a speed V2b, as in FIG. 10, the speed of the final output shaft 123 is O2b. The rotational directions V2a V2b of the motor 151 are opposite in FIGS. 9 and 10, but the outputs O2a and O2b are made in the same direction by the first to fourth gears 110, 120, and 130, particularly, the fourth gear unit 140 in the system.

FIGS. 11A to 11D are graphs illustrating outputs (torque-speed) by independent operation of motors in FIGS. 8A to 10, and FIGS. 12A to 12C are graphs illustrating outputs (torque-speed) by combination operation of motors in FIGS. 8A to 10.

Figure 11A:
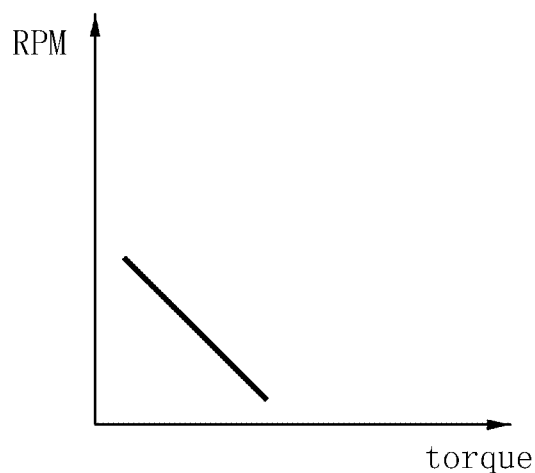
FIGS. 11A to 11D are graphs illustrating outputs (torque-speed) by independent operation in FIGS. 8A to 10.
Figure 11B:
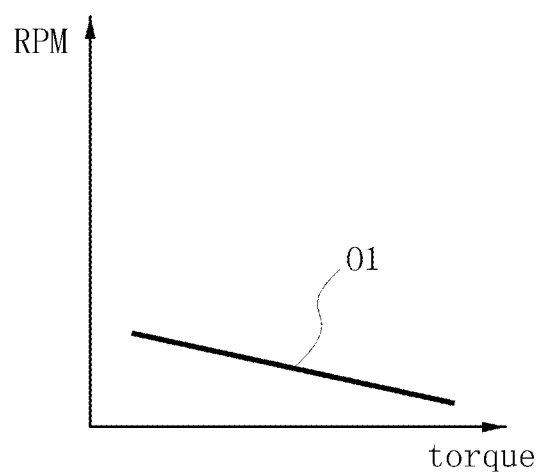
Figure 11C:
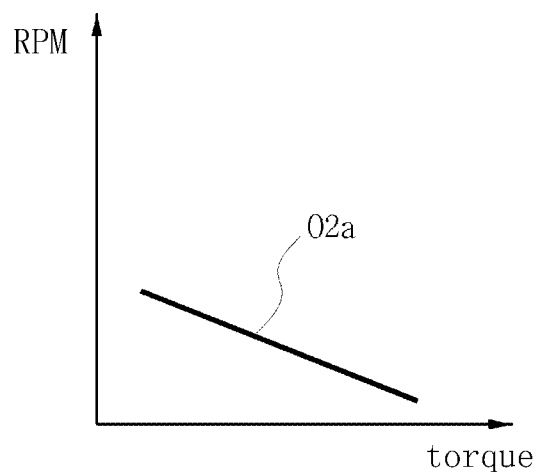
Figure 11D:
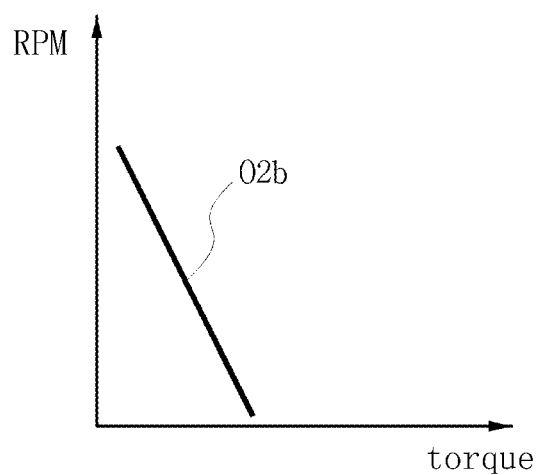

For example, assuming that two motors 151 and 161 having the torque-speed (torque-RPM) characteristic, as in FIG. 11A, are used, when only the motor 161 is operated, as in FIG. 8A, it can be seen that the output characteristic O1 of the final output shaft 123 has the shape illustrated in FIG. 11B by the internal reduction ratio of the gear system 100 and the output characteristics O2a and O2b of the final output shaft 123 that can be generated by forward or backward operation of the motor 151, as in FIGS. 9 and 10, have the shapes, as in FIGS. 11C and 11D.

Figure 12A:
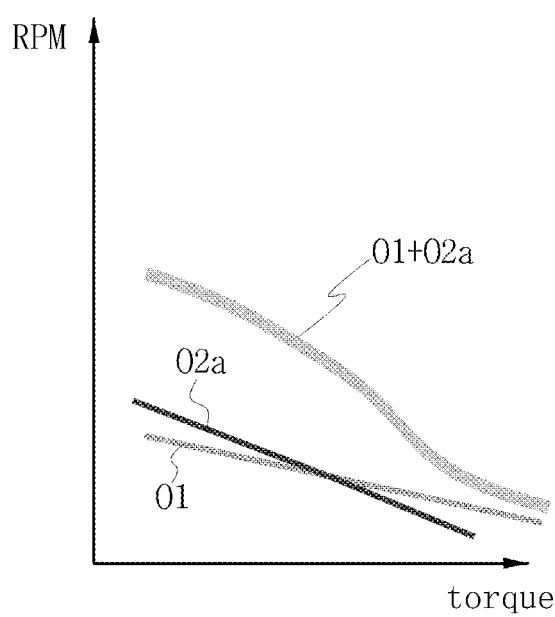
FIGS. 12A to 12C are graphs illustrating outputs (torque-speed) by combination operation in FIGS. 8A to 10.
Figure 12B:
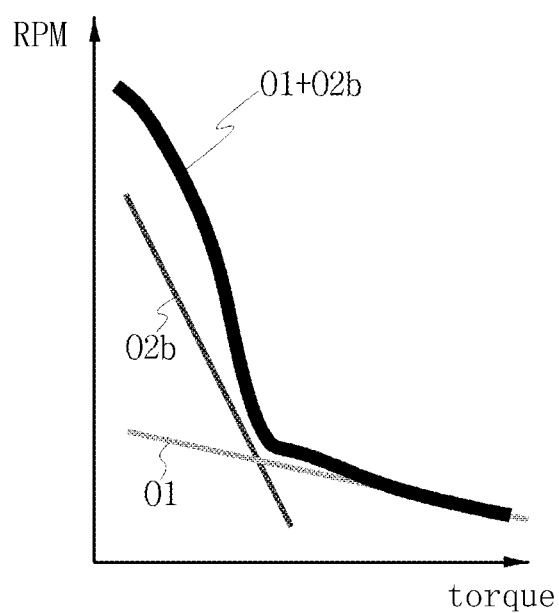
Figure 12C:
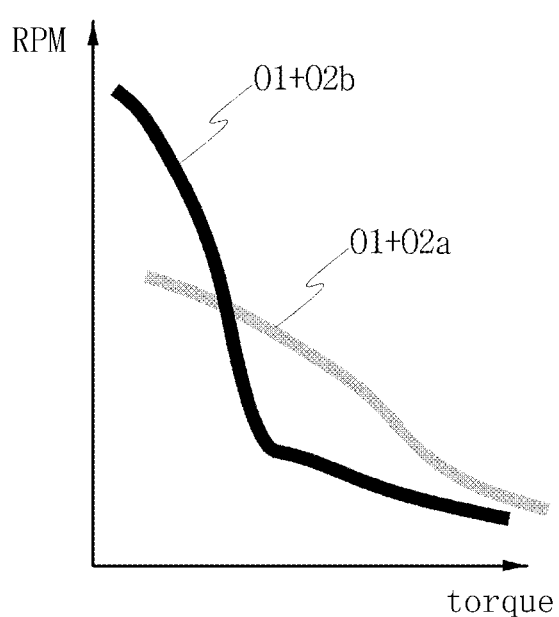

According to this configuration, in the planetary gear set including two input parts, as in FIGS. 3 and 6, input speeds are combined and outputted, so when the two motors 151 and 161 are simultaneously operated, two output characteristics O1+O2a and O1+O2b can be further achieved, as in FIG. 12C.

That is, FIG. 12A illustrates the output characteristic O1+O2a of the carrier shaft 123 as the final output when the two motors 151 and 161 are simultaneously operated, as in FIGS. 8A and 9, and driving forces V1 and V2a are inputted to the sun gear shaft 112 and the ring gear shaft 133. Further, FIG. 12B illustrates the output characteristic O1+O2b of the carrier shaft 123 as the final output when the two motors 151 and 161 are simultaneously operated, as in FIGS. 8A and 10, and the driving forces V1 and V2b are inputted to the sun gear shaft 112 and the ring gear shaft 133.

Accordingly, the final output characteristic generated by the gear system illustrated in FIGS. 1 and 2 in accordance with an exemplary embodiment of the present invention can have the output characteristic of O1+O2a or O1+O2b in accordance with the operational direction (forward or backward) of the motor 151, as in FIG. 12C.

Figure 13:
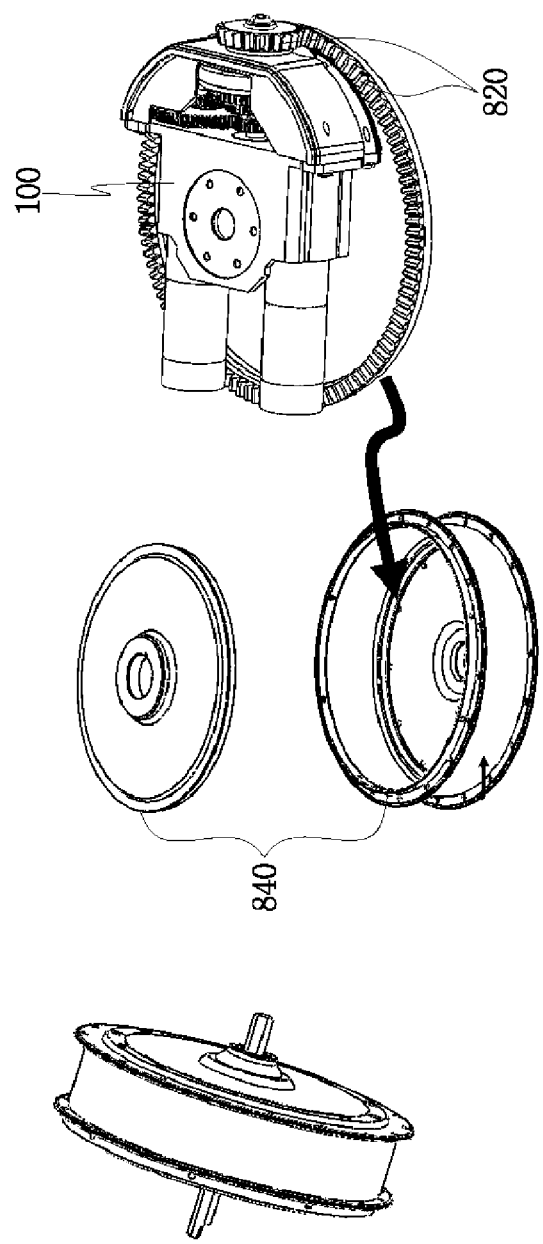
FIG. 13 is a view illustrating an example using the gear system of FIG. 1.

FIG. 13 is a view illustrating an example using the gear system 100 of FIG. 1.

In order to easily apply the output of the gear system 100 for combining inputs to a system for driving wheels using a rotary body 840 including a bevel gear 820, a method of driving the rotary body 840 covering a motor is exemplified. Though not illustrated, a tire, a driving pulley, or spokes of a bicycle may be additionally mounted on the rotary body 840.

As described above, the final output of the gear system 100 for combining inputs generated by an exemplary embodiment of the present invention can improve the maximum speed-maximum torque, as in FIG. 12C, by combining the characteristics of two small motors with different reduction ratios, and if necessary, it can drive the motors with a small amount of current consumption (the most efficient characteristic). As described above, when two different motors are used or the reduction ratios of motors are adjusted, it is possible to achieve characteristics required by a robot or a mechanical system through small motors.

Meanwhile, a gear system 200 for combining inputs which includes at least three power sources operating as input parts is described hereafter.

Figure 14:
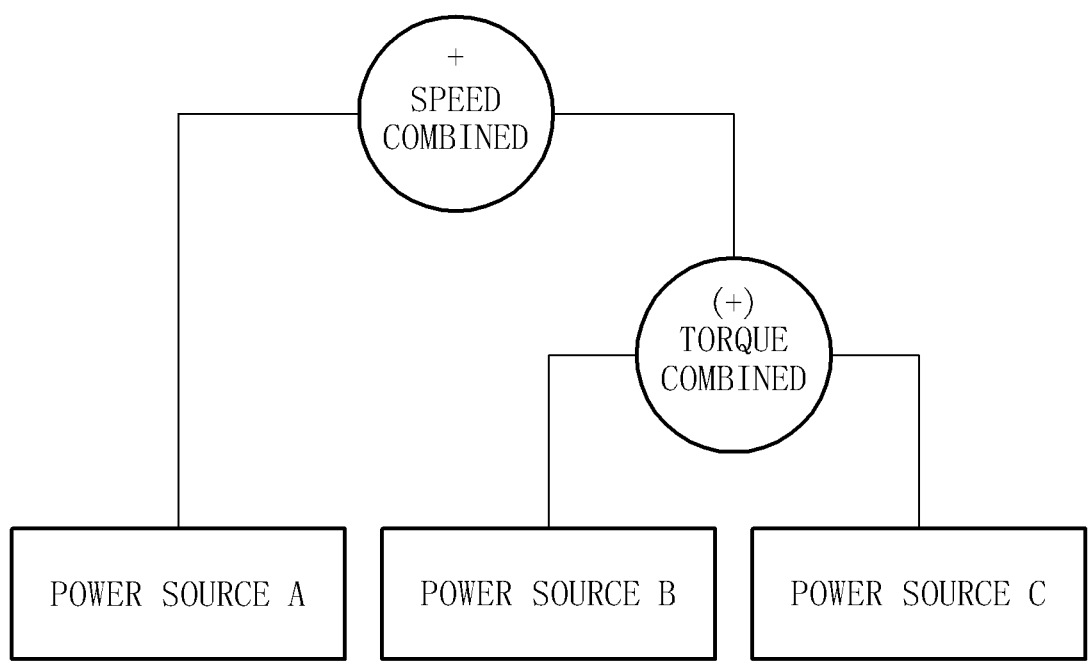
FIG. 14 is a view schematically illustrating a gear system for combining inputs according to another exemplary embodiment of the present invention.

Referring to FIG. 14, the gear system 200 for combining inputs according to another exemplary embodiment of the present invention can generated various outputs by combining inputs of at least three power sources 210, 220, and 230. For the convenience of the following description, it is assumed that three power sources, that is, first to third power sources 210, 220, and 230 are used, one of the three power sources is a manual input part (for example, a pedal of a bicycle) and the other two power sources are motors. It should be understood that the power sources are not limited to the motor and the pedal and any power sources can be used as long as they can generate a rotational force such as an engine.

The power sources illustrated in FIG. 14 may be any driving units that generate a rotational force such as an internal combustion engine (the engine of a vehicle) and a manual input part (a pedal of a bicycle or a link that can be turned manually).

The gear system 200 for combining inputs schematically illustrated in FIG. 14 can generate various outputs by combining a plurality of inputs using a power transmission mechanism using engagement of gears. The gear system 200 for combining inputs according to an exemplary embodiment of the present invention can generate various outputs by separately combining torque and speeds (rotational speed or rotational angular speed, generally referred to as 'speed' hereafter) of power sources, when combining inputs from three power sources 210, 220, and 230. Further, torque and speed may be sequentially combined.

Referring to FIG. 14, the torque from a power source B and the torque from a power source C are combined (the symbol '(+)' means torque combination in FIG. 14) and the output by the torque combination and the speed of the power source A are combined (the symbol '+' means speed combination in FIG. 14). The speed of the power source A may be combined, after the torque of the power source B and the torque of the power source C are combined. As described above, the gear system 200 for combining inputs according to another exemplary embodiment of the present invention can generate various outputs by combining the torque from the three different power sources A, B, and C (combining torque from two input parts) and combining the speeds (combining speeds of two input parts), as illustrated in FIG. 14.

Figure 15:
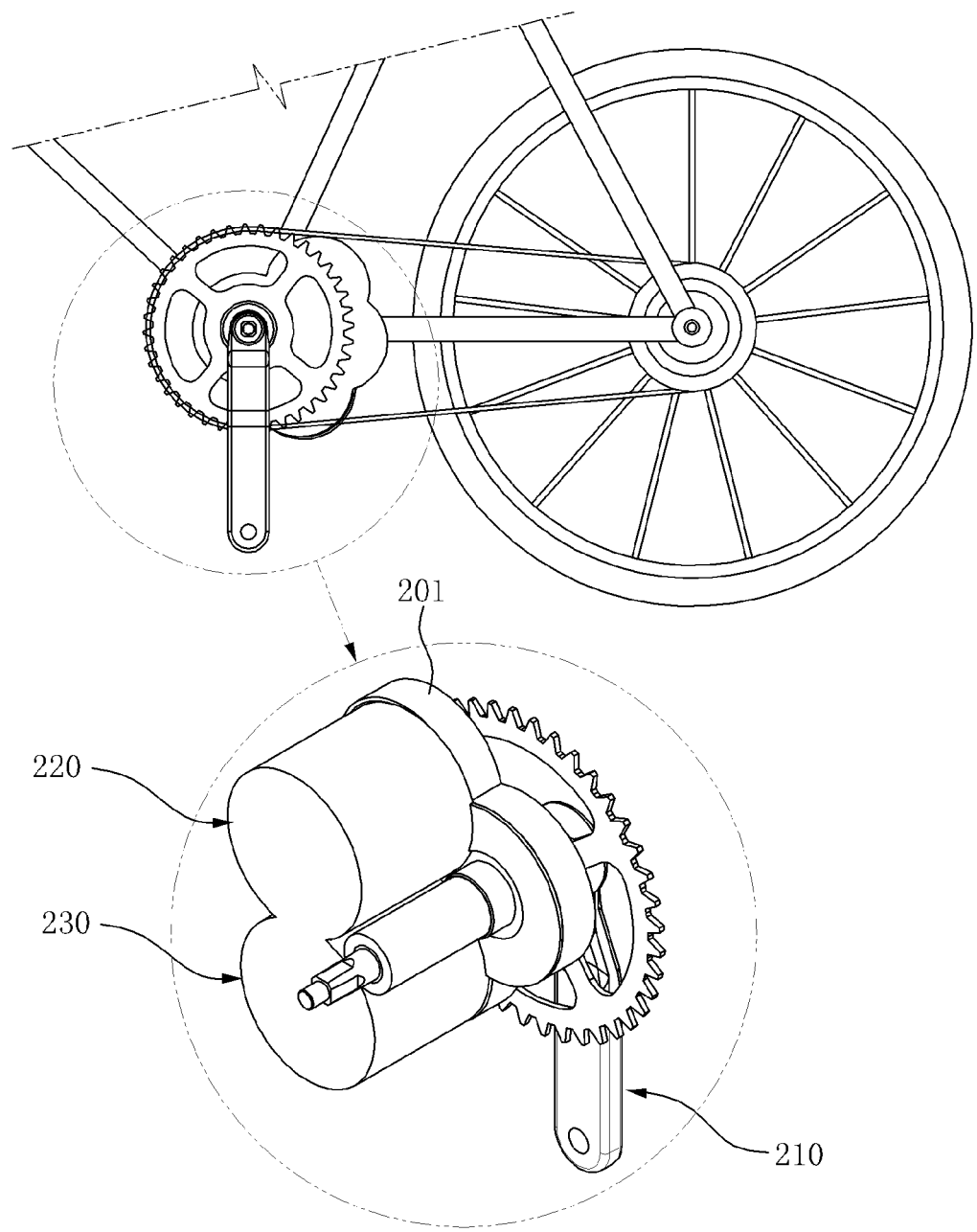
FIG. 15 is a view illustrating an example when the gear system for combining inputs illustrated in FIG. 14 is applied to an electric bicycle.

FIG. 15 illustrates an example when the gear system 200 for combining inputs according to an exemplary embodiment of the present invention is applied to an electric bicycle. When the gear system 200 for combining inputs is applied to an electric bicycle, the system may be disposed at the position where pedals are mounted. When the system is applied to an electric bicycle, the first power source 210 may be a pedal and the second and third power sources 220 and 230 may be motors. When the gear system 200 for combining inputs is applied to an electric bicycle, it needs to be fixed to a side of a sprocket (not illustrated), and to this end, the gear system 200 may be fixed to a case 201 on a side of the sprocket around which the bicycle chain is wound.

Figure 16:
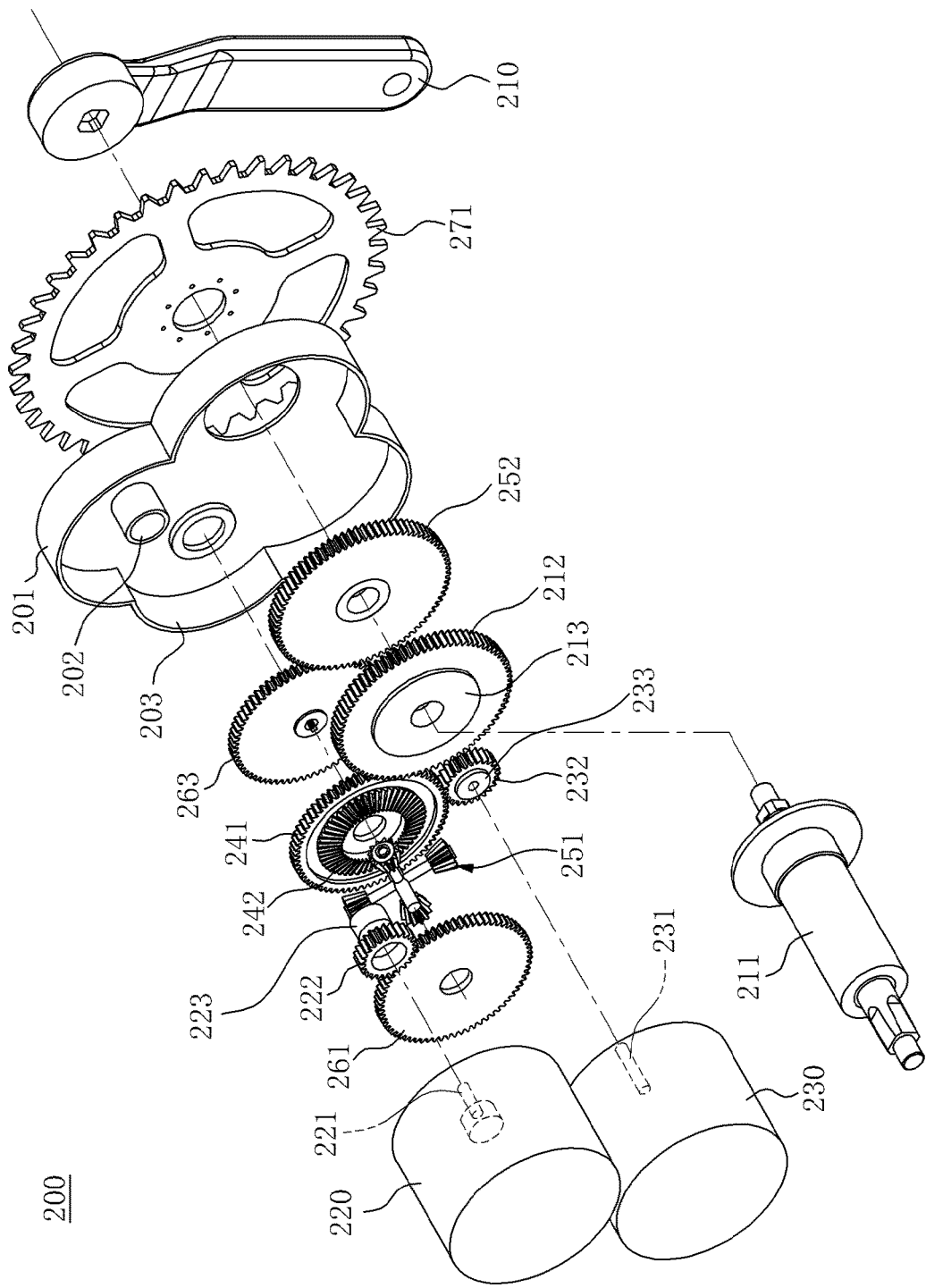
FIG. 16 is an exploded perspective view illustrating the gear system for combining inputs of FIG. 15.

FIG. 16 is an exploded view of the gear system 200 for combining inputs illustrated in FIG. 15. As illustrated in FIG. 16, the gear system 200 for combining inputs may include first to third power sources 210, 220, and 230 and a plurality of gears.

The first power source 210 is a pedal and the second and third power sources 220 and 230 are motors. A sprocket 271 for winding a chain is disposed at side of the first power source 210 and is combined with a first output gear 252. The second and third power sources 220 and 230 may be fixed to the case 201. To this end, a power source fixing portion 203 may be formed at the case 201. Further, a clutch fixing portion 202 for fixing a clutch bearing 223, which is described below, may also be formed at the case 201. However, the structure or the shape of the case 201 is not limited to that illustrated in FIG. 16.

Figure 17:
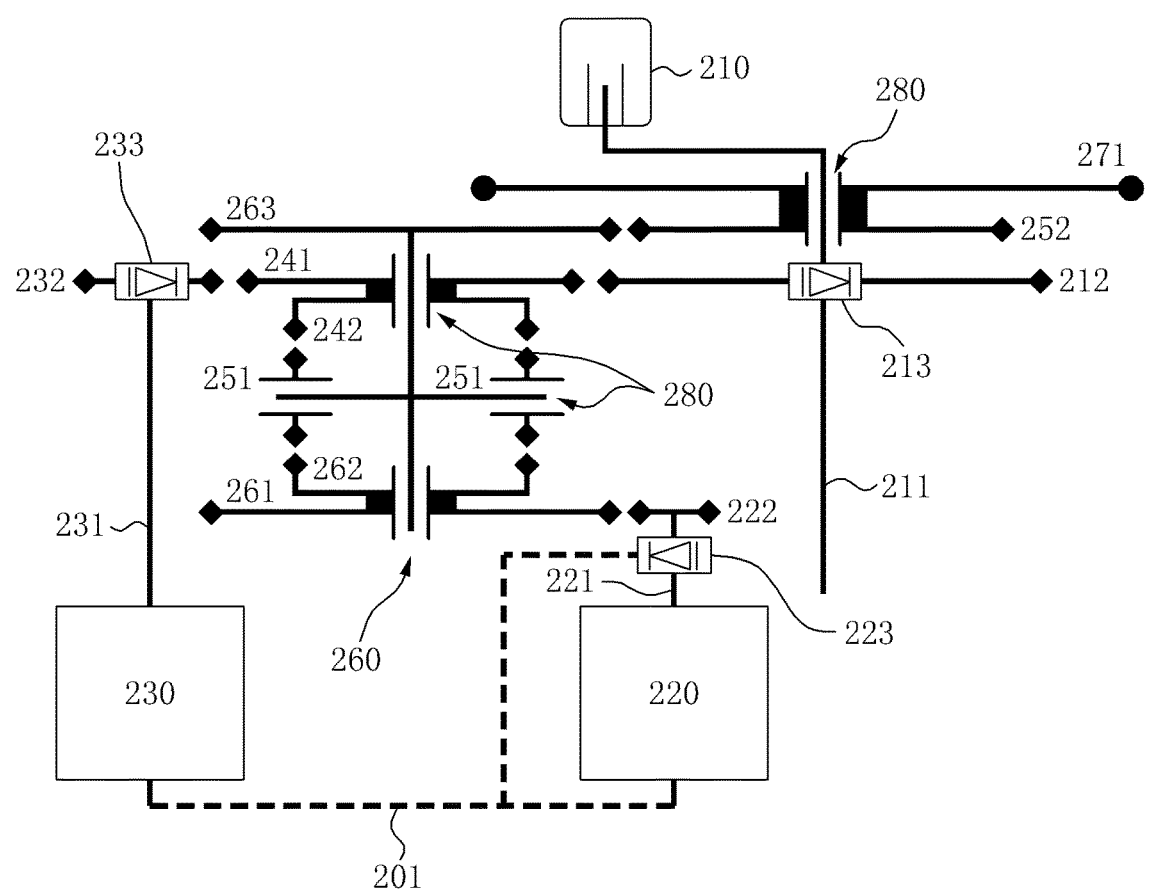
FIGS. 17 to 21 are exemplary views illustrating an input-output relationship of the gear system for combining inputs of FIG. 16.

Referring to FIGS. 16 and 17, the gear system 200 for combining inputs according to an exemplary embodiment of the present invention may include the first power source 210 generating a rotational force, the second power source 220 generating a rotational force identical to or different from that of the first power source 210, the third power source 230 generating a rotational force identical to or different from those of the first power source 210 and the second power source 220, and a gear unit generating a resultant output by combining the rotational forces from the first to third power sources 210, 220, and 230. The gear unit can generate a resultant output by combining the torque between two of the first to third power source 210, 220, and 230 and combining the speed of the other one power source.

According to this configuration, it is possible to generate various outputs from various power sources having the same or different characteristics. That is, it is possible to achieve outputs having various characteristics by combining torque or speeds of the first to third power sources 210, 220, and 230.

The gear unit may include first to third main gears 212, 222, and 232 directly coupled to rotary shafts 211, 221, and 231, respectively, of the first to third power sources 210, 220, and 230, and a connection gear assembly 260 receiving a rotational force between at least two of the first to third main gears 212, 222, and 232. The connection gear unit 260 can receive and combine rotational forces from the first and second power sources 210 and 220 and transmit the resultant torque to the sprocket 271, or receive and combine rotational forces from the second and third power sources 220 and 230 and transmit the resultant torque to the sprocket 271, or receive and combine rotational forces from the first to third power sources 210, 220, and 230 and transmit the resultant torque to the sprocket 271. The connection gear assembly 260 does not combine only rotational forces, but combines torque or speeds of the first to third power sources 210, 220, and 230. The torque combination or the speed combination may depend on the type of coupling the first to third power sources 210, 220, and 230 to the connection gear assembly 260.

The first power source 210 includes a rotary shaft 211 rotating with the first main gear 212. A first clutch bearing 213 may be mounted on the first main gear 212. The clutch bearing 213 is a kind of one-way bearing allowing the first main gear 212 to rotate only in any one direction. Further, the rotary shaft 211 is fitted in the first output gear 252 too through the first main gear 212. The first output gear 252 can transmit a rotational force or output (resultant output) to the sprocket 271.

The first output gear 252 is engaged with the second output gear 263 and can receive a rotational force from the second output gear 263. Meanwhile, the second output gear 263 receives a rotational force through the connection gear assembly 260.

The connection gear unit 260 may be a gear module that combines rotational forces from the first to third power sources 210, 220, and 230. The torque or the speeds of the first to third power sources 210, 220, and 230 can be combined in accordance with the configuration or the shape of the connection gear assembly 260. The configuration or the shape of the connection gear mechanisms 260 and 360 illustrated in FIGS. 16 to 24 is an example and is not limited thereto.

Referring to FIGS. 16 and 17, the connection assembly 260 may include at least one or more direct gears 241 and 261 having a rotational center in a straight line with the rotational centers of the first to third main gears 212, 222, and 232.

The direct gears 241 and 261 may be gears that receive rotational forces from the first to third main gears 212, 222, and 232 and rotate other gears of the connection gear assembly 260. The connecting gear assembly 260 may include an idle gear 251 that is rotated passively by rotation of the direct gears 241 and 261.

In the example illustrated in FIG. 16, the idle gear 251 is a differential gear. The idle gear 251 may rotate in mesh with the two direct gears 241 and 261. First and second bevel gears 242 and 262 may be formed on sides of the direct gears 241 and 261 to engage with the idle gear 251. The idle gear 251 can transmit a rotational force to the second output gear 263.

Meanwhile, the direct gear 241 and 261 may include a first direct gear 241 engaged with the first main gear 212 and the third main gear 232 and a second direct gear 261 engaged with the second main gear 222.

The second main gear 222 may be fixed to the rotary shaft 221 of the second power source 220. A second clutch bearing 223 may be mounted on the second main gear 222. The second clutch bearing 223 can restrict the second main gear 222 so that it rotates only in any one direction.

The third main gear 232 may be fixed to the rotary shaft 231 of the third power source 230. A third clutch bearing 233 may be mounted on the third main gear 232. The third clutch bearing 233 can restrict the third main gear 232 so that it rotates only in any one direction.

Herein, the first to third clutch bearings 213, 223, and 233 may be mounted or not on the first to third main gears 212, 222, and 232. The first and third bearings 213 and 233 have a purpose different from that of the second clutch bearing 223. That is, the first and third clutch bearing 213 and 233 control any one of the first and third power sources 210 and 230 operating as a load (interference), when any one of the power sources is operated or the two power sources have different speeds. On the other hand, the second clutch bearing 223 prevents idling due to rotational forces of gears rotating in mesh with each other.

Referring to FIG. 17, the second and third power sources 220 and 230 may be fixed to the case 201. Unlike the first and third clutch bearing 213 and 233, the second clutch bearing 223 may be fixed to the case 201.

The reference numeral '280' not stated above indicates a bearing in FIG. 17.

The principle of combining torque or speeds (rotating velocity) of the first to third power sources 210, 220, and 230 by means of the connection gear assembly 260 is described hereafter with reference to the drawings.

In FIGS. 18 to 21, the symbol '⊙' means that a gear comes out of the plane and the symbol 'o' with X therein means that a gear goes into the plane. That is, they indicate the rotational direction of gears.

Figure 18:
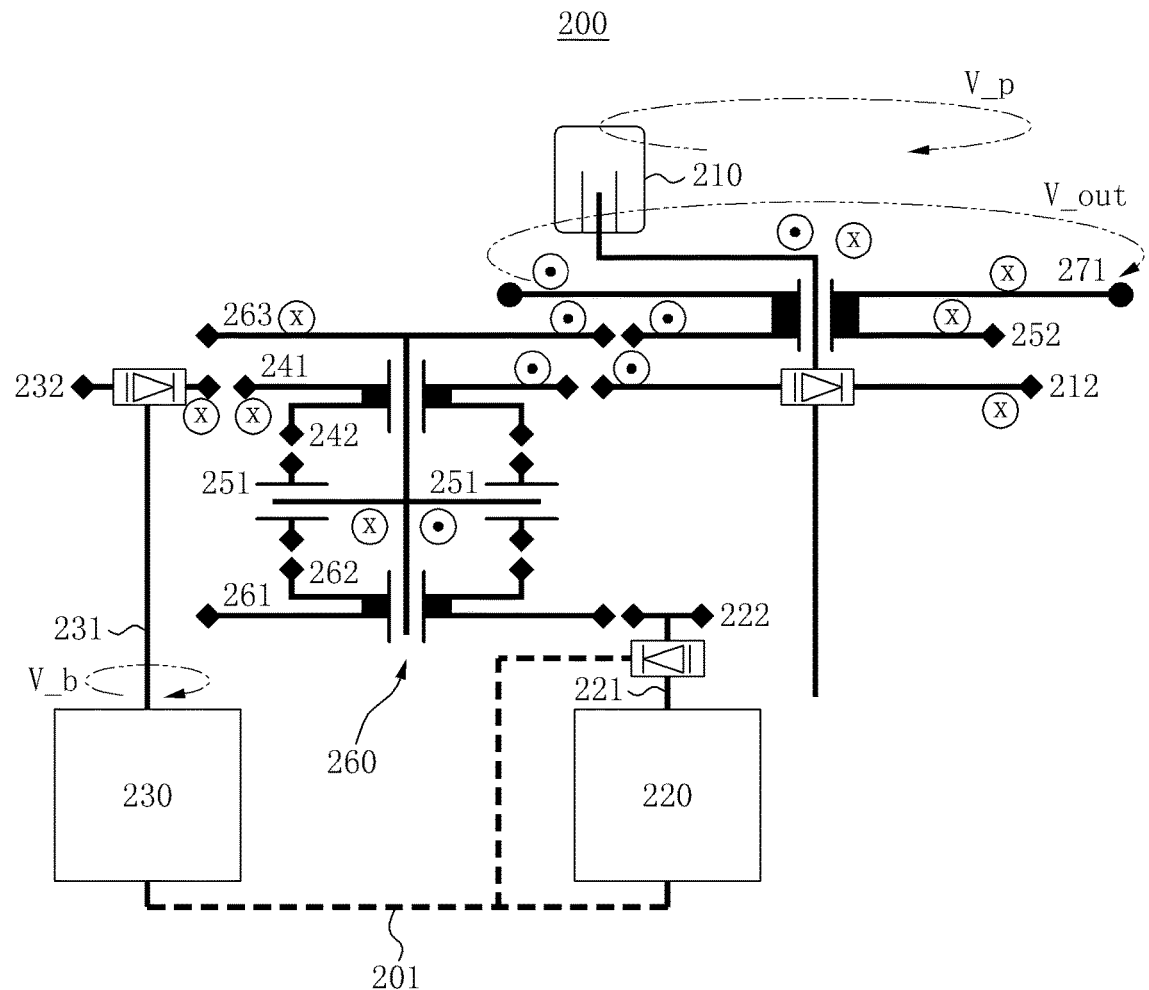

FIG. 18 is a view illustrating power transmission when the first power source 210 and the third power source 230 are simultaneously operated, that is, rotated. That is, the first and third power sources 210 and 230 operate as input parts. V_p is the rotational speed of the first power source 210, V_out is a resultant output, that is, the rotational speed of the sprocket 271.

The driving force of the first power source 210 is transmitted to the first direct gear 241 through the first main gear 212 and the driving force of the third power source 230 is transmitted to the first direct gear 241 through the third main gear 232. As described above, when the first and third main gears 212 and 232 are both rotated, with the first direct gear 241 in mesh with both of the first main gear 212 and the third main gear 232, the torque (driving torque) of the first and third power sources 210 and 230 can be combined by the first direct gear 241. As the first direct gear 241 rotates, the second output gear 263 sharing the rotary shaft with the first direct gear 241 rotates. As the first output gear 252 engaged with the second output gear 263 rotates, the sprocket 271 rotates at a speed V_out.

If the first power source 210 is a pedal of an electric bicycle and the third power source 230 is a motor, the driving torque of the pedal 210 and the driving torque of the motor are added. Since driving toque is combined, when the motor 230 is operated, the pedal 210 can be operated with low torque. Accordingly, the rider on the bicycle can go with a small force. In another point of view, when a rider pushes the pedal 210 with the motor 230 operating under same load conditions, the motor 230 can be operated with a small current. In this case, since the load applied to the motor 230 can be reduced, the motor 230 is operated with a small current and accordingly energy efficiency can be increased.

Figure 19:
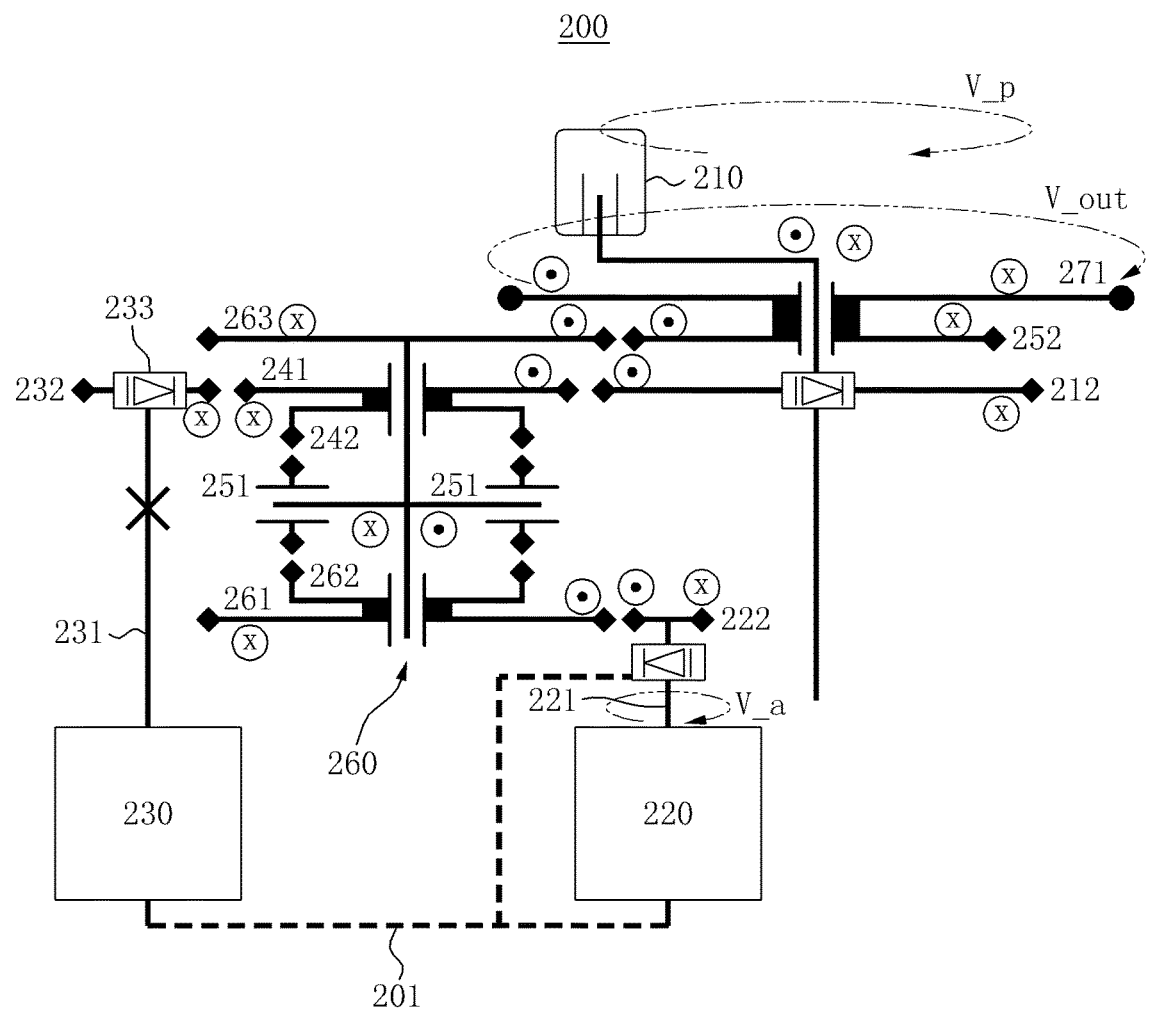

FIG. 19 is a view illustrating power transmission when the first power source 210 and the second power source 220 are simultaneously operated (rotated). The driving force of the first power source 210 is transmitted sequentially to the first main gear 212, the first direct gear 241, and the first bevel gear 242. The driving force of the second power source 220 is transmitted sequentially to the second main gear 222, the second direct gear 261, and the second bevel gear 262.

The connection gear assembly 260 includes first and second bevel gears 242 and 262 integrally formed with the first direct gear 241 and the second direct gear 261 and the idle gear 251 may be engaged with the first and second bevel gears 242 and 262. Since the idle gear 251 is engaged with both of the first and second bevel gears 242 and 262, the speeds of the first power source 210 and the second power source 220 can be combined by the idle gear 251. As the first bevel gear 242 is rotated by the first power source 210, the idle gear 251 engaged with the first bevel gear 242 is rotated. With the idle gear 251 rotated by the first bevel gear 242, the idle gear 251 is rotated by the second bevel gear 262 rotated by the second power source 220. Accordingly, the rotational speed of the idle gear 251 is combined by the first and second bevel gears 242 and 262.

As the idle gear 251 rotates, the second output gear 263, the first output gear 252, and the sprocket 271 are sequentially rotated. The rotational speed of the second output gear 263 is the rotational speed of the first bevel gear 242 over 2 plus the rotational speed of the second bevel gear 262 over 2. Accordingly, the speeds of the first power source 210 and the second power source 220 are added, and the second output gear 263, the first output gear 252, and the sprocket 271 are sequentially operates, so the bicycle is driven. If the first power source 210 is a pedal of an electric bicycle and the second power source 220 is a motor, even if a rider pushes slowly the pedal 210, the bicycle can be driven fast by the speed of the motor 220.

Meanwhile, although the third main gear 232 of the third power source 230 is engaged with the first direct gear 241 in FIG. 19, a rotational force is not transmitted to the rotary shaft 231 by the third clutch bearing 233 on the third main gear 232, so interference by the third power source 230 (motor) can be prevented.

Figure 20:
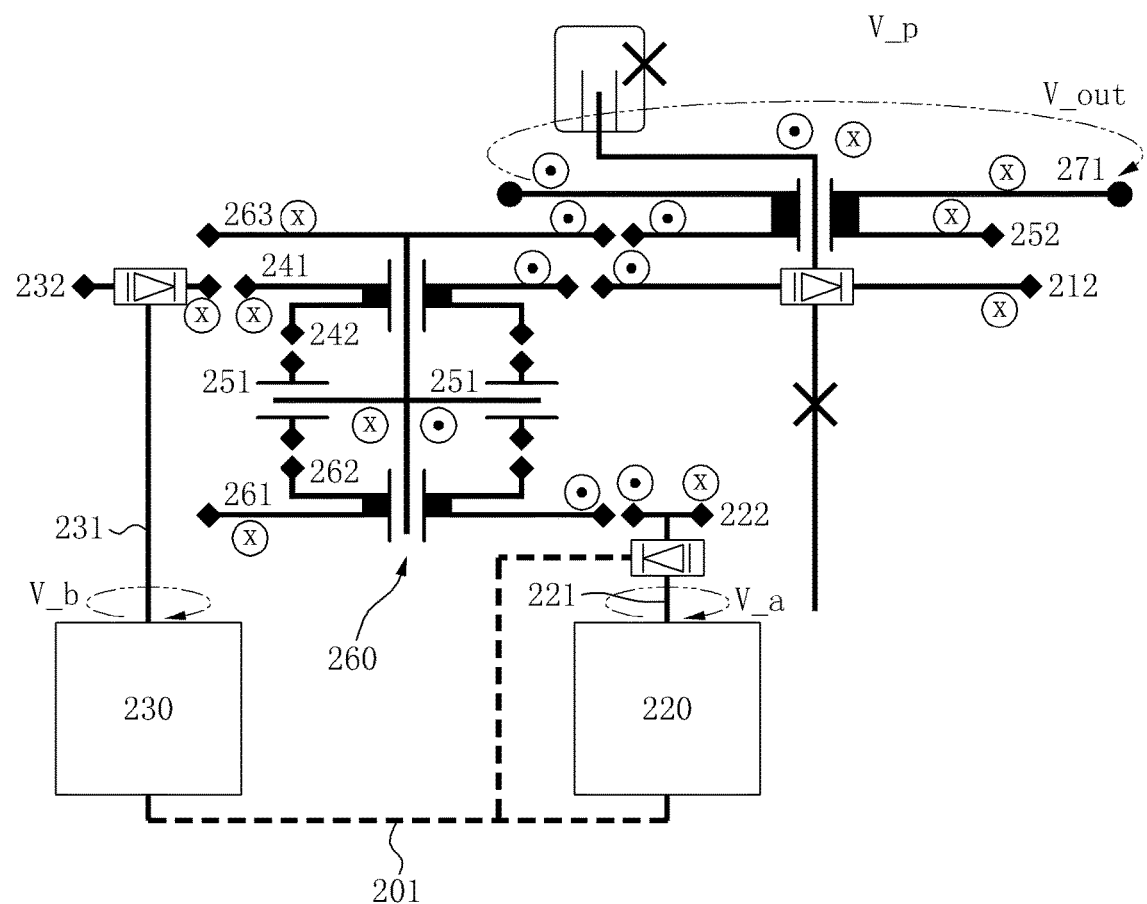

FIG. 20 illustrates power transmission when the second power source 220 and the third power source 230 are simultaneously operated. The rotational force of the second power source 220 is transmitted sequentially to the second main gear 222, the second direct gear 261, and the second bevel gear 262. The rotational force of the third power source 230 is transmitted sequentially to the third main gear 232, the first direct gear 241, and the first bevel gear 242.

The idle gear 251 is also rotated by the rotation of the first and second bevel gears 242 and 262, that is, the idle gear 251 rotates while combining the rotational speeds of the first and second bevel gears 242 and 262. As the idle gear 251 rotates, the second output gear 263, the first output gear 252, and the sprocket 271 are sequentially rotated. The speed of the second output gear 263 is the rotational speed of the first bevel gear 242 over 2 plus the rotational speed of the second bevel gear 262 over 2. Accordingly, the speeds of the two power sources 220 and 230 are combined, thereby driving the bicycle. Even if the rider does not push the pedal of the bicycle, the bicycle can be driven by the first clutch bearing 213.

Figure 21:
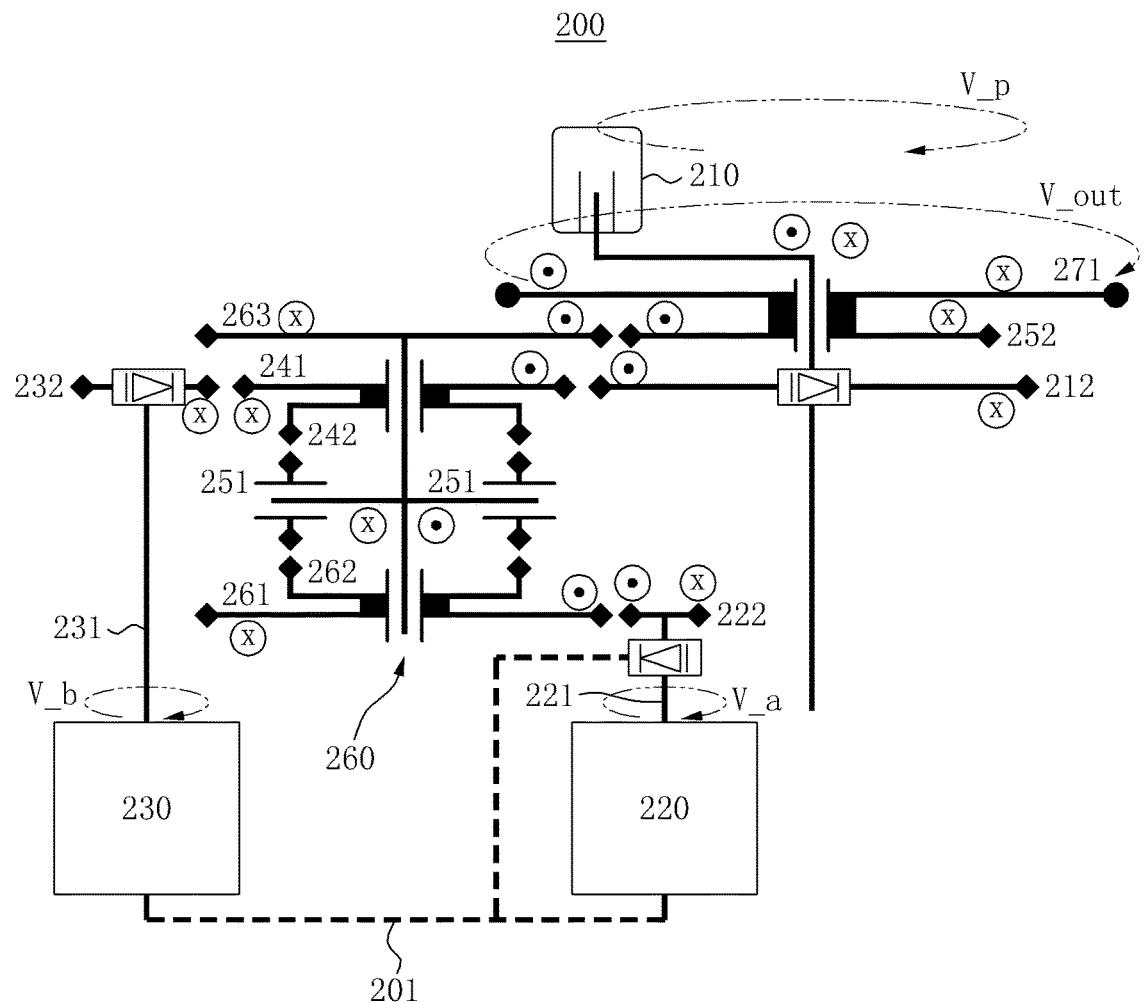

FIG. 21 illustrates power transmission when the first to the third power sources 210,220,230 are simultaneously operated. Similar to the case illustrated in FIG. 18, the first power source 210 and the third power source 230 operate the idle gear 251 using resultant torque. The second power source 220 combines the speed of the idle gear 251 by operating the second bevel gear 262. Assuming the power sources are applied to an electric bicycle, the second power source 220, that is, the motor combines torque together with the pedal 210 (which reduces a force for pushing the pedal). Further, the second power source 220, that is, the motor combines speeds together with the pedal 210 (which reduces the speed of driving the pedal).

As described above, the idle gear 251 can combine the speeds of the first power source 210 and the second power source 220 or the speeds of the second power source 220 and the third power source 230. That is, the connection gear assembly 260 can include the idle gear 251 that combines the speeds of the first power source 210 and the second power source 220 or the speeds of the second power source 220 and the third power source 230.

The gear system 200 for combining inputs according to an exemplary embodiment of the present invention can combine the speeds of power sources by means of the direct gears 241 and 261 and the idle gear 251. Further, torque can be combined by the direct gear 241. The direct gears 241 and 261 contribute to not only torque combination, but speed combination, but the idle gear 251 contributes to only speed combination.

Further, when both of torque and speeds are both combined, speeds may be combined after torque is combined.

In the gear system 200 for combining inputs according to an exemplary embodiment of the present invention, two main gears 212 and 232 are both engaged with any one direct gear 241 of the first and second direct gears 241 and 261, the other main gear 222 is engaged with the other direct gear 261, and the idle gear 251 receives the rotational forces from both of the first and second direct gears 241 and 261, so torque or speeds of power sources (that is, the input parts) can be combined.

The connection gear assembly 260 may include the direct gear 241 engaged with any two main gears 212 and 232 of the first to third main gears 210, 220, and 230, and the idle gear 251 rotated passively by the rotational force of the direct gear 241. The idle gear 251 can receive and combine not the torque, but the speeds of the direct gears 241 and 261.

In the gear system 200 for combining inputs according to an exemplary embodiment of the present invention, the first to third power sources 210, 220, and 230 may be arranged such that any two main gears 212 and 232 of the first to third main gears 212, 222, and 232 are all engaged with the direct gear 241 and the other one main gear 222 is engaged with the idle gear 251. According to this arrangement, the torque of the power sources 210 and 230 engaged with the direct gear 241 of the first to third power sources 210, 220, and 230 can be combined and the speed of the power source 220 engaged with the idle gear 251 can be combined.

Meanwhile, when inputs of the three power sources 210, 220, and 230 are all combined, torque is combined first by the direct gear 241 and then speeds can be combined by the idle gear 251. The idle gear 251 can combine speeds using the rotational forces of the two main gears 212 and 232 of which the torque is combined by the direct gear 241 and the rotational force of the other one main gear 222, as inputs.

Figure 22A:
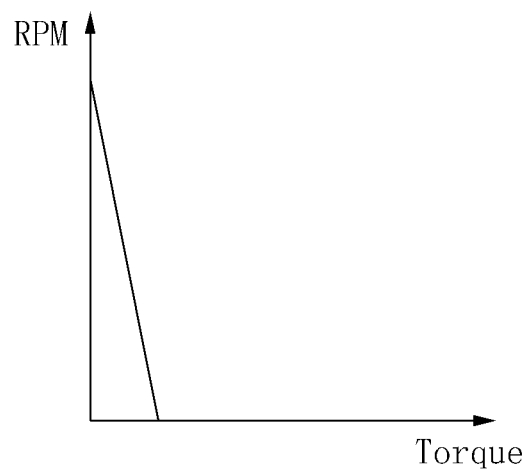
FIGS. 22A to 22D are graphs illustrating output characteristics power sources by the gear system for combining inputs of FIG. 16.
Figure 22B:
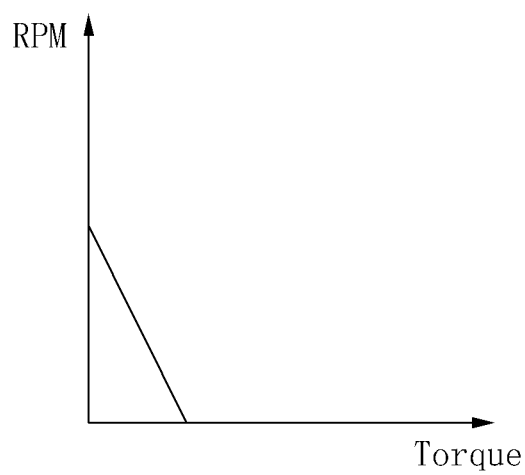

FIGS. 22A to 22D are graphs illustrating speed-torque characteristics of outputs from the first to third power sources. For example, assuming that the characteristics of the second power source (for example, a motor) and a third power source (for example, a motor) are those illustrated in FIG. 22A and the speed-torque characteristic of the first power source (for example, a pedal pushed by a rider) is that illustrated in FIG. 22D, the following characteristics can be obtained. FIG. 22B is a speed-torque characteristic graph of a bicycle when only the first power source 210 (a pedal) is operated. When the speed of the first power source 210 (pedal) is V_p and torque of the first power source 210 is T_p, the final speed V_out and the final output torque T_out of a bicycle can be obtained from Equation 1 and Equation 2.

$$V\_out = \frac{Z2}{Z4} \times \frac{1}{2} \times \frac{Z3}{Z1} \times \frac{C1}{C2} \times V\_p \qquad \text{[Equation 1]}$$

$$T\_out = \frac{1}{\left(\frac{Z2}{Z4} \times \frac{1}{2} \times \frac{Z3}{Z1} \times \frac{C1}{C2}\right)} \times T\_p \quad \text{[Equation 2]}$$

In Equation 1 and Equation 2, Z1, Z2, Z3, Z4, and C1 are the numbers of teeth of the second output gear 252, the first main gear 212, the first output gear 263, the first direct gear 241, and the sprocket 271, and C2 is the number of teeth of the chain wound around the sprocket 271. Further, in the following Equation 3 to Equation 6, Z5, Z6, and Z7 are the third main gear 232, the direct gear 261, and the second main gear 222. To help understanding, it is assumed that Z1 is 35, Z2 is 50, Z3 is 50, Z4 is 35, C1 is 40, and C2 is 20.

Figure 22C:
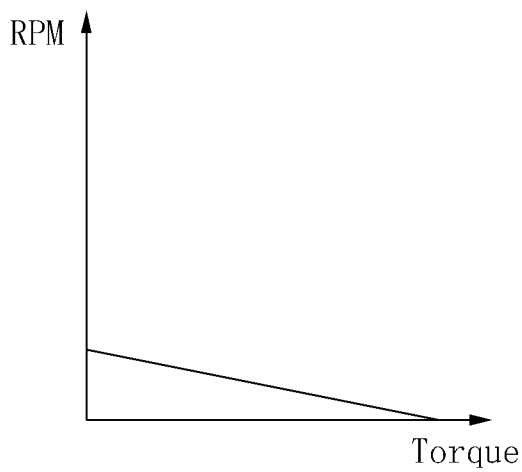
Figure 22D:
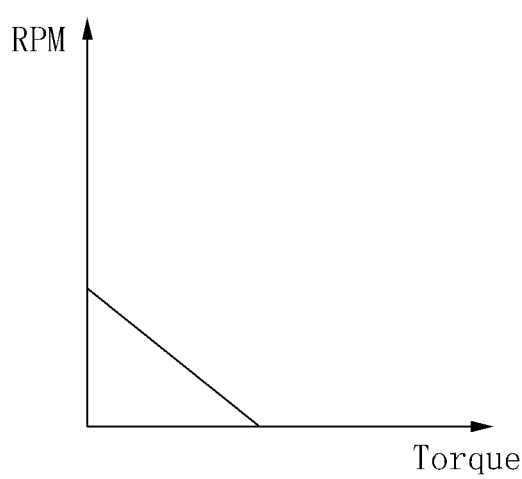

FIG. 22D is a speed-torque graph of final output when only the third power source 230 (a motor) is operated. When the torque of the third power source 230 that is an input part is T_b and the speed of the third power source 230 is V_b, the speed and torque of the final output can be calculated from the following Equation 3 and Equation 4.

$$V\_out = \frac{Z5}{Z4} \times \frac{1}{2} \times \frac{Z3}{Z1} \times \frac{C1}{C2} \times V\_b \quad \text{[Equation 3]}$$

$$T\_out = \frac{1}{\left(\frac{Z5}{Z4} \times \frac{1}{2} \times \frac{Z3}{Z1} \times \frac{C1}{C2}\right)} \times T\_b \quad \text{[Equation 4]}$$

FIG. 22C is a speed-torque graph of final output when only the second power source 220 (a motor) is operated. When the torque of the second power source 220 that is an input part is T_a and the speed of the second power source 220 is V_a, the speed and torque of the final output can be calculated from the following Equation 5 and Equation 6.

$$V\_out = \frac{Z7}{Z6} \times \frac{1}{2} \times \frac{Z3}{Z1} \times \frac{C1}{C2} \times V\_a \quad \text{[Equation 5]}$$

$$T\_out = \frac{1}{\left(\frac{Z7}{Z6} \times \frac{1}{2} \times \frac{Z3}{Z1} \times \frac{C1}{C2}\right)} \times T\_a \quad \text{[Equation 6]}$$

Figure 23A:
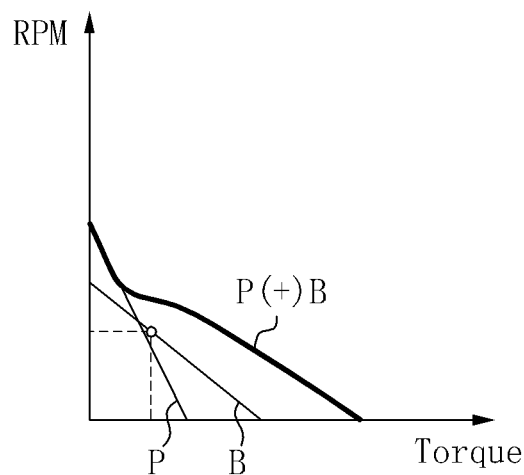
FIGS. 23A to 23D are graphs illustrating combined output characteristics by the gear system for combining inputs of FIG. 16.
Figure 23B:
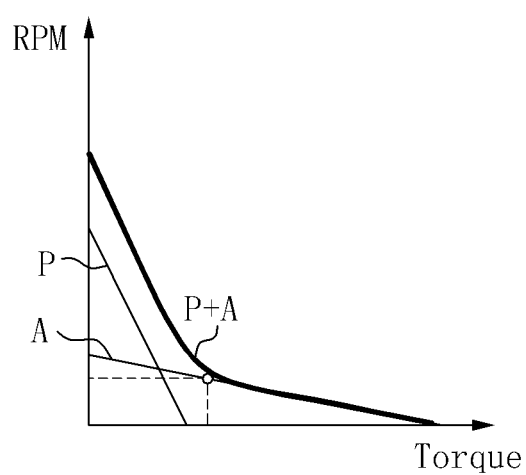
Figure 23C:
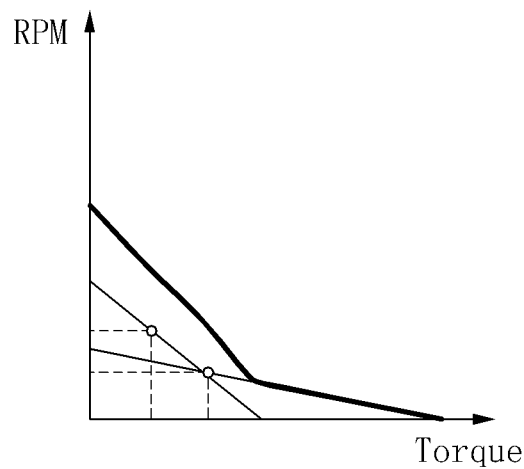
Figure 23D:
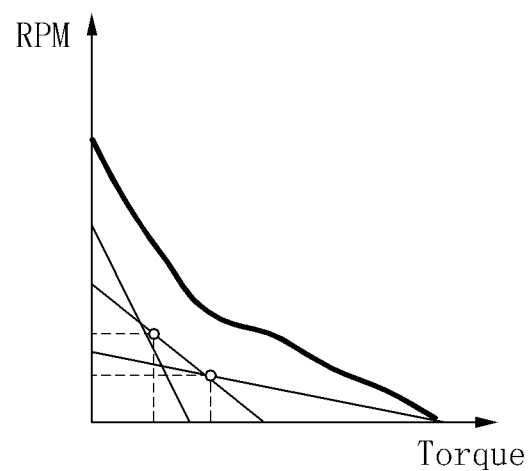

FIGS. 23A to 23C are speed-torque graphs of final output when two power sources or three power sources are simultaneously operated. FIG. 23A is an output graph when the first power source 210 (a pedal) and the third power source 230 (a motor) are simultaneously operated (illustrating the power line of FIG. 18). Since the torque from the first power source 210 and the third power source 230 is combined, the final output torque is torque added with Equation 2 and Equation 4. FIG. 23B is an output graph when the first power source 210 and the second power source 220 (a motor) are simultaneously operated (illustrating the power line of FIG. 19). Since the speeds from the first power source 210 and the second power source 220 is combined, the final output speed is a speed added with Equation 1 and Equation 5. FIG. 23C is a graph when the second power source 220 (a motor) and the third power source 230 (a motor) are operated (illustrating a power line of FIG. 20). Since the speeds from the second power source 220 and the third power source 230 are combined, the final output speed is a speed added with Equation 3 and Equation 5. FIG. 23D is an output graph when the first to third power sources 210, 220, and 230 are all operated (illustrating the power line of FIG. 21).

The gear system 200 for combining inputs according to an exemplary embodiment of the present invention, as in FIGS. 22A to 22D and 23A to 23C, and Equation 1 to Equation 6, can generate various outputs by combining speeds and torque of at least three power sources 210, 220, and 230. In detail, the peculiar characteristics of the power sources can be used for output, and if necessary, the speeds and the torque of two or more power sources can be combined, or the characteristics of three or more power sources can be combined, if necessary.

Figure 24:
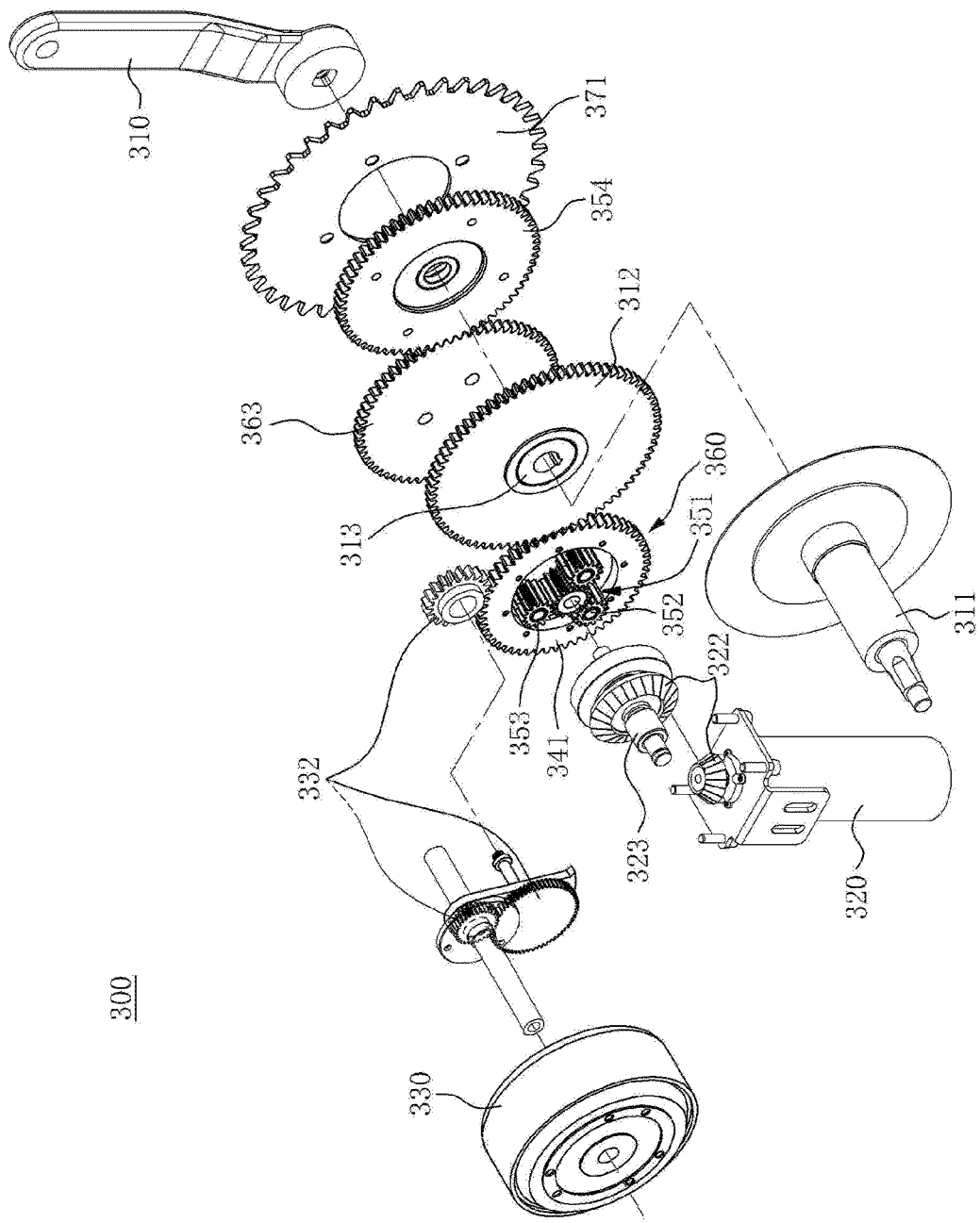
FIG. 24 is an exploded perspective view illustrating a modified example of the gear system for combining inputs of FIG. 16.

FIG. 24 is an exploded perspective view illustrating a modified example of the gear system for combining inputs according to an exemplary embodiment of the present invention. The gear system 300 for combining inputs illustrated in FIG. 24 is different from the gear system 200 for combining inputs illustrated in FIG. 16 in that the second power source 320 or the third power source 330 is different in shape and the connection gear assembly 360 is different in structure.

When the gear system 300 for combining inputs illustrated in FIG. 24 is applied to an electric bicycle, the first power source 310 may be a pedal and the second and third power sources 320 and 330 may be motors. Referring to FIG. 24, it can be seen that the second power source 320 and the third power source 330 are different motors. Unlike that illustrated in FIG. 16, a bevel gear 322 may be used for any one motor 320, if necessary.

Further, the connection gear assembly 360 may include a direct gear 341 and an idle gear 351. Herein, the direct gear 341 is engaged with a first main gear 312 and a third main gear 332 and the connection gear assembly 360 may include the idle gear 351 internally engaged with the direct gear 341.

Further, the idle gear 351 may include planetary gears 353 internally engaged with the direct gear 341 and a sun gear 352 engaged with the planetary gears 351. In this case, the direct gear 341 may be a ring gear.

When the first power source 310 (a pedal) is operated in FIG. 24, a rotary shaft 311 connected to the first power source 310 is operated by the operation of the first power source 310, a first main gear 312 fitted on the rotary shaft 311 and equipped with a first clutch bearing 313 and the direct gear 341 engaged with the ring gear of the planetary gear set are sequentially operated. Accordingly, a first output gear 363 and a second output gear 354 integrally formed with the carrier of the planetary gear set are operated and a sprocket 371 coupled to the second output gear 354 is operated, thereby driving the bicycle. The third main gear 332 combined with a clutch bearing freely rotates (idles), so the operation of the first power source 310 does not influence the third power source 330.

The types of the gears and the types (shapes) of the motors of the gear system 300 for combining inputs illustrated in FIG. 24 are different, but similar to the operation principle illustrated in FIG. 16, torque of the first power source 310 and the third power source 330 is combined and the combined characteristic may be combined with the speed of the second power source 320. Although not illustrated in the figures, torque and speeds can be combined when there are two power sources, as in FIGS. 18 to 20.

The above description is an example that explains the spirit of the present invention and may be changed and modified in various ways without departing from the basic features of the present invention by those skilled in the art. Accordingly, the embodiment described herein are provided not to limit, but to explain the spirit of the present invention and the spirit and the scope of the present invention are not limited by the embodiments. The protective range of the present invention should be construed on the basis of claims and all the technical spirits in the equivalent range should be construed as being included in the scope of the right of the present invention.

INDUSTRIAL APPLICABILITY

The present invention can be used in technical fields requiring various driving forces such as a robot, a carrier, and a vehicle.

The invention claimed is:

1. A gear system for combining inputs, comprising:
a first gear unit;
a second gear unit that rotates in mesh with the first gear unit;
a third gear unit that rotates in mesh with at least one of the first gear unit and the second gear unit; and
a first and a second power sources that generate a first and a second driving forces respectively,
wherein two of the first to third gear units are input parts receiving the first and second driving forces, from the first and second power sources, respectively, and a third one of the first to third gear units is an output part outputting a resultant force of the first and second driving forces,
at least one of the first power source and the second power source includes a fourth gear unit rotating in a same output direction of a shaft of the first or second power source, and
wherein the fourth gear unit includes:
a forward gear and a backward gear that rotate forward and backward, respectively when the shaft of the first or second power source rotates forward and backward;
a first input gear and a second input gear that input the first or second driving force to corresponding input parts in cooperation with the forward gear and the backward gear; and
at least one intermediate gear that is engaged with the forward gear and the first input gear, or with the backward gear and the second input gear.

2. The gear system of claim 1, wherein the first power source has a first motor and the second power source has a second motor, and the first and second motors have a different capacity.

3. The gear system of claim 1, wherein the forward gear and the backward gear respectively include a clutch bearing or a one-way bearing.

4. A gear system for combining inputs, comprising:
a first power source that transmits a first rotational force;
a second power source that generates a second rotational force identical to or different from the first rotational force of the first power source;
a third power source that generates a third rotational force identical or different from the first and second rotational forces of the first power source and the second power source; and
a gear unit that generates a resultant output by combining two or more of the first, second and third rotational forces,
wherein the gear unit includes:
a first, a second and a third main gears directly coupled to a first, a second and a third rotary shafts of the first to third power sources, respectively; and
a connection gear assembly receiving rotational forces from at least two of the first to third main gears.

5. The gear system of claim 4, wherein the connection gear assembly includes at least one direct gear having a rotational center in a straight line with the rotational centers of the first to third main gears.

6. The gear system of claim 5, wherein the direct gear includes a first direct gear engaged with the first main gear and the third main gear and a second direct gear engaged with the second main gear.

7. The gear system of claim 6, wherein when the first to third main gears are all rotated with the first direct gear engaged with the first main gear and the third main gear, torque of the first to third power sources is combined by the first direct gear.

8. The gear system of claim 7, wherein the connection gear assembly includes an idle gear that combines speeds of the first power source and the second power source or combines speeds of the second power source and the third power source.

9. The gear system of claim 5, wherein the direct gear is engaged with the first main gear and the second main gear and the connection gear assembly includes an idle gear internally engaged with the direct gear.

10. The gear system of claim 4, wherein the connection gear assembly includes a direct gear engaged with any two of the first to third main gears and an idle gear rotated passively by a rotational force of the direct gear.

11. The gear system of claim 10, wherein the first to third power source are arranged such that any two of the first to third main gears are all engaged with the direct gear and the other main gear is engaged with the idle gear.

12. The gear system of claim 11, wherein torque of two of the first to third power sources engaged with the direct gear is combined.

13. The gear system of claim 12, wherein the idle gear combines speeds by receiving the rotational force of two of the first to third main gears of which torque is assembled by the direct gear and the rotational force of the other main gear.

* * * * *